US012307499B2

(12) United States Patent
Zhou et al.

(10) Patent No.: US 12,307,499 B2
(45) Date of Patent: May 20, 2025

(54) ITEM RECOMMENDATION METHOD AND DEVICE FOR PROTECTING USER PRIVACY AND LEARNING SYSTEM

(71) Applicant: Alibaba Damo (Hangzhou) Technology Co., Ltd., Hang Zhou (CN)

(72) Inventors: Jingren Zhou, Bellevue, WA (US); Bolin Ding, Redmond, WA (US); Zitao Li, Hangzhou (CN)

(73) Assignee: Alibaba Damo (Hangzhou) Technology Co., Ltd., Hangzhou (CN)

( * ) Notice: Subject to any disclaimer, the term of this patent is extended or adjusted under 35 U.S.C. 154(b) by 244 days.

(21) Appl. No.: 17/989,683

(22) Filed: Nov. 18, 2022

(65) Prior Publication Data
US 2023/0162262 A1    May 25, 2023

(30) Foreign Application Priority Data
Nov. 24, 2021  (CN) .......................... 202111405912.3

(51) Int. Cl.
*G06Q 30/00*  (2023.01)
*G06N 20/00*  (2019.01)
*G06Q 30/0601*  (2023.01)

(52) U.S. Cl.
CPC ......... *G06Q 30/0631* (2013.01); *G06N 20/00* (2019.01)

(58) Field of Classification Search
CPC .................................................... G06Q 30/00
See application file for complete search history.

(56) References Cited

U.S. PATENT DOCUMENTS

| 10,943,260 B2 | 3/2021 | Choi et al. |
| 10,963,942 B1 | 3/2021 | Franke et al. |
| (Continued) |

FOREIGN PATENT DOCUMENTS

| CN | 107392049 A | 11/2017 |
| CN | 111259238 A | 6/2020 |
| (Continued) |

OTHER PUBLICATIONS

Vaz P., "Signal (Stream) synchronization with White noise sources, in biomedical applications", Science Direct, dated Feb. 15, 2025 (Year: 2015).*

(Continued)

*Primary Examiner* — Kelly S. Campen
*Assistant Examiner* — Brittany E Bargeon
(74) *Attorney, Agent, or Firm* — Lee & Hayes, P.C.

(57) ABSTRACT

An item recommendation method, a device and a learning system for protecting user privacy are provided. The method includes: obtaining a locally collected scoring matrix, the scoring matrix being used to describe a scoring situation of multiple users on multiple items; locally training an item expression matrix and a user expression matrix corresponding to the scoring matrix, and sending a first user expression matrix obtained by local training to a server, so that the server aggregates and processes user expression matrices independently uploaded by the multiple data devices, and sends an aggregated second user expression matrix to the multiple data devices; and predicting degree of preferences of the multiple users for the multiple items according to the item expression matrix obtained by the local training and the second user expression matrix, so that item recommendations are performed for the multiple users according to the degrees of preference.

20 Claims, 11 Drawing Sheets

(56) References Cited

U.S. PATENT DOCUMENTS

| | | | |
|---|---|---|---|
| 11,244,017 B2 | 2/2022 | Sayyadi et al. | |
| 11,416,536 B2 | 8/2022 | Zhao | |
| 11,475,161 B2* | 10/2022 | Zheng | G06N 7/01 |
| 11,544,341 B2 | 1/2023 | Cypher et al. | |
| 11,847,538 B2* | 12/2023 | Cao | G06N 20/00 |
| 11,941,520 B2* | 3/2024 | Sutcher-Shepard | G06N 5/01 |
| 12,105,837 B2* | 10/2024 | LaTerza | G06F 40/40 |
| 2018/0336486 A1* | 11/2018 | Chu | G06N 20/00 |
| 2019/0272550 A1 | 9/2019 | Souders et al. | |
| 2020/0177219 A1* | 6/2020 | Luus | G06N 3/088 |
| 2021/0019805 A1 | 1/2021 | Kumar et al. | |
| 2021/0326757 A1 | 10/2021 | Rawat et al. | |
| 2021/0342697 A1 | 11/2021 | Fang et al. | |
| 2022/0108213 A1* | 4/2022 | Cao | G06N 3/045 |
| 2022/0284232 A1* | 9/2022 | Yin | G06V 10/774 |

FOREIGN PATENT DOCUMENTS

| | | |
|---|---|---|
| CN | 112541593 A | 3/2021 |
| CN | 113609398 A | 11/2021 |
| CN | 103093376 A | 5/2023 |

OTHER PUBLICATIONS

CN SR dated Nov. 24, 2021, from CN Patent Application No. 2021114059123, 2 pages.
Flanagan et al., "Federated Multi-View Matrix Factorization for Personalized Recommendations," Helsinki Research Center, Europe Cloud Service Competence Center, Huawei Technologies Oy (Finland) Co., Ltd., arXiv:2004.04256v1, Apr. 8, 2020, 16 pages.
NeurIPS 2019, WeBank, Dec. 17, 2019, 1 page.

* cited by examiner

ITEM RECOMMENDATION METHOD AND DEVICE FOR PROTECTING USER PRIVACY AND LEARNING SYSTEM

CROSS REFERENCE TO RELATED PATENT APPLICATIONS

This application claims is related to and claims priority to Chinese Application No. 202111405912.3, filed on 24 Nov. 2021 and entitled "Item Recommendation Method and Device for Protecting User Privacy and Learning System," which is incorporated herein by reference in its entirety.

TECHNICAL FIELD

The present disclosure relates to the technical field of artificial intelligence, and in particular, to project recommendation methods and devices for protecting user privacy, and learning systems.

BACKGROUND

With the continuous development of technologies such as the Internet of Things and the mobile Internet, the Internet is flooded with various types of information, posing challenges for users to search for effective information. For example, an e-commerce scenario is used as an example. It takes a lot of time for a user to search for a product that meets his/her expectation among a large number of products. Based on this, various types of recommendation models are designed to implement targeted recommendations for users.

During a training process of an existing recommendation model, it will face the problems of data island and data security. The industry continues to face important technical issues, i.e., it must first protect users' private data from misuse and leakage, and at the same time recommend more personalized items to the users. Therefore, to improve the performance of recommendation models, these problems need to be overcome.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer readable instructions as permitted by the context above and throughout the present disclosure.

Embodiments of the present disclosure provide an item recommendation method, a device and a learning system for protecting user privacy, and through a strategy of federated matrix decomposition, training of a recommendation model of each data aggregator is realized, so as to realize targeted item recommendations for users.

The embodiments of the present disclosure provide an item recommendation method for protecting user privacy, which is applied to any data device among multiple data devices used for federated learning, and the method includes:

obtaining a locally collected scoring matrix, the scoring matrix being used to describe a scoring situation of multiple users on multiple items, and scoring matrices collected individually by the multiple data devices having a same user set and different item sets;

locally training an item expression matrix and a user expression matrix corresponding to the scoring matrix, and sending a first user expression matrix obtained by local training to a server, so that the server aggregates and processes user expression matrices independently uploaded by the multiple data devices, and sends an aggregated second user expression matrix to the multiple data devices, wherein the item expression matrix is used to describe attribute features of the multiple items, the user expression matrix is used to describe the multiple users' preference features, and the first user expression matrix is sent to the server in a protected manner; and predicting degree of preferences of the multiple users for the multiple items according to the item expression matrix obtained by the local training and the second user expression matrix if a training cut-off condition is met, so that item recommendations are performed for the multiple users according to the degrees of preference.

The embodiments of the present disclosure provide an item recommendation apparatus for protecting user privacy, which is applied to any data device among multiple data devices used for federated learning, and the apparatus includes:

an acquisition module configured to obtain a locally collected scoring matrix, the scoring matrix being used to describe a scoring situation of multiple users on multiple items, and scoring matrices collected individually by the multiple data devices having a same user set and different item sets;

a training module configured to locally train an item expression matrix and a user expression matrix corresponding to the scoring matrix, and send a first user expression matrix obtained by local training to a server, so that the server aggregates and processes user expression matrices independently uploaded by the multiple data devices, and sends an aggregated second user expression matrix to the multiple data devices, wherein the item expression matrix is used to describe attribute features of the multiple items, the user expression matrix is used to describe the multiple users' preference features, and the first user expression matrix is sent to the server in a protected manner; and a prediction module configured to predict degree of preferences of the multiple users for the multiple items according to the item expression matrix obtained by the local training and the second user expression matrix if a training cut-off condition is met, so that item recommendations are performed for the multiple users according to the degrees of preference.

The embodiments of the present disclosure provide a data device. The data device is any data device among multiple data devices used for federated learning, and includes: a processor and a display screen.

The processor is configured to obtain a locally collected scoring matrix, the scoring matrix being used to describe a scoring situation of multiple users on multiple items, and scoring matrices collected individually by the multiple data devices having a same user set and different item sets; locally train an item expression matrix and a user expression matrix corresponding to the scoring matrix, and send a first user expression matrix obtained by local training to a server, so that the server aggregates and processes user expression matrices independently uploaded by the multiple data devices, and sends an aggregated second user expression matrix to the multiple data devices, wherein the item expression matrix is used to describe attribute features of the multiple items, the user expression matrix is used to describe the multiple users' preference features, and the first user expression matrix is sent to the server in a protected manner; and predict degree of preferences of the multiple users for the multiple items according to the item expression matrix obtained by the local training and the second user expression matrix if a training cut-off condition is met, so that item recommendations are performed for the multiple users according to the degrees of preference.

The display screen is configured to display items respectively recommended to the multiple users.

The embodiments of the present disclosure provide a non-transitory machine-readable storage medium. An executable code is stored on the non-transitory machine-readable storage medium. When the executable code is executed by a processor of a data device, the processor is made to implement at least the item recommendation method for protecting user privacy as described in the first aspect.

The embodiments of the present disclosure provide a learning system for protecting user privacy, which includes:
a first data device and a second data device for federated learning, and a server.

The first data device is configured to obtain a locally collected first scoring matrix, the first scoring matrix being used to describe scoring situations of multiple users on multiple items; and locally train a first item expression matrix and a first user expression matrix corresponding to the first scoring matrix, send the first user expression matrix to the server, and receive a second user expression matrix fed back by the server, predict degrees of preference of the multiple users for the multiple items in the first scoring matrix based on the first item expression matrix and the second user expression matrix if a training cut-off condition is met, and perform item recommendations for the multiple users according to the degrees of preference, wherein the first user expression matrix is sent to the server in a protected manner.

The second data device is configured to obtain a locally collected second scoring matrix, the second scoring matrix being used to describe scoring situations of the multiple users on the multiple items, and the first scoring matrix and the second scoring matrix having a same user set and different item sets; and locally train a second item expression matrix and a third user expression matrix corresponding to the second scoring matrix, send the third user expression matrix to the server, receives the second user expression matrix fed back by the server, and if the training cut-off condition is met, predict degrees of preference of the multiple users for the multiple items in the second scoring matrix based on the second item expression matrix and the second user expression matrix if a training cut-off condition is met, and perform item recommendations for the multiple users according to the degrees of preference, wherein the third user expression matrix is sent to the server in a protected manner.

The server is configured to perform aggregation processing on the first user expression matrix and the third user expression matrix to obtain the second user expression matrix, and send the second user expression matrix to the first data device and the second data device.

In the embodiments of the present disclosure, a vertical federated matrix decomposition learning framework is provided. Specifically, a plurality of data aggregators can individually collect respective scoring matrices that reflect users' scoring situations on items through respective data devices. The rows in a scoring matrix represent users, and the columns represent items. The scoring matrices collected by different data aggregators have the same set of users and different sets of items. In other words, a situation of vertical federated learning is assumed here. In order to train a recommendation model by combining scoring matrices collected by multiple data devices, each data device can locally train, based on a scoring matrix collected thereby, a user expression (user embedding) matrix and an item expression (item embedding) matrix corresponding to the scoring matrix. A scoring matrix can be decomposed into a user expression matrix and an item expression matrix, where the item expression matrix is used to describe attribute features of the items, and the user expression matrix is used to describe the users' preference features. In the embodiments of the present disclosure, the user expression matrix and the item expression matrix are model parameters to be finally obtained from the training. In order to realize federated learning, during a training process, each data device can upload a respective user expression matrix obtained by local training to a server under protection. The server aggregates user expression matrices uploaded by each data device, and distributes an aggregated user expression matrix to each data device, to allow each data device to update its local user expression matrix, and continue to perform local training of the user expression matrix and the item expression matrix. Finally, at the end of training, each data device will obtain a locally trained item expression matrix and a user expression matrix that is shared through server aggregation. Based on a multiplication result of its own item expression matrix and the above-mentioned shared user expression matrix, each data device can predict a degree of preference of each user in a corresponding user set for each item in a corresponding item set, and based thereon, can recommend more preferred items to the users.

In the above solutions, a method for realizing matrix decomposition in vertical federated learning is provided, that is, a model for recommending items for users is trained by means of vertical federated learning, which is mainly composed of user expression matrices and item expression matrices. During a training process, the item expression matrices only need to be iteratively and locally trained on data devices, and only the user expression matrices are uploaded to a server for aggregation. Through building a user expression matrix together by various data devices, a user expression matrix including more abundant user preference features can be obtained by each data device, so that each data device can implement a more accurate item recommendation effect to users based on such user expression matrix and an item expression matrix thereof. During the training process, data devices do not share their scoring matrices, user expression matrices and item expression matrices directly, thus ensuring data security.

BRIEF DESCRIPTION OF THE DRAWINGS

In order to illustrate the technical solutions in the embodiments of the present disclosure more clearly, accompanying drawings used in the description of the embodiments are briefly introduced as follows. Apparently, the drawings in the following description represent some embodiments of the present disclosure. For one of ordinary skill in the art, other drawings can also be obtained from these drawings without making any creative effort.

DETAILED DESCRIPTION

Figure 1A:
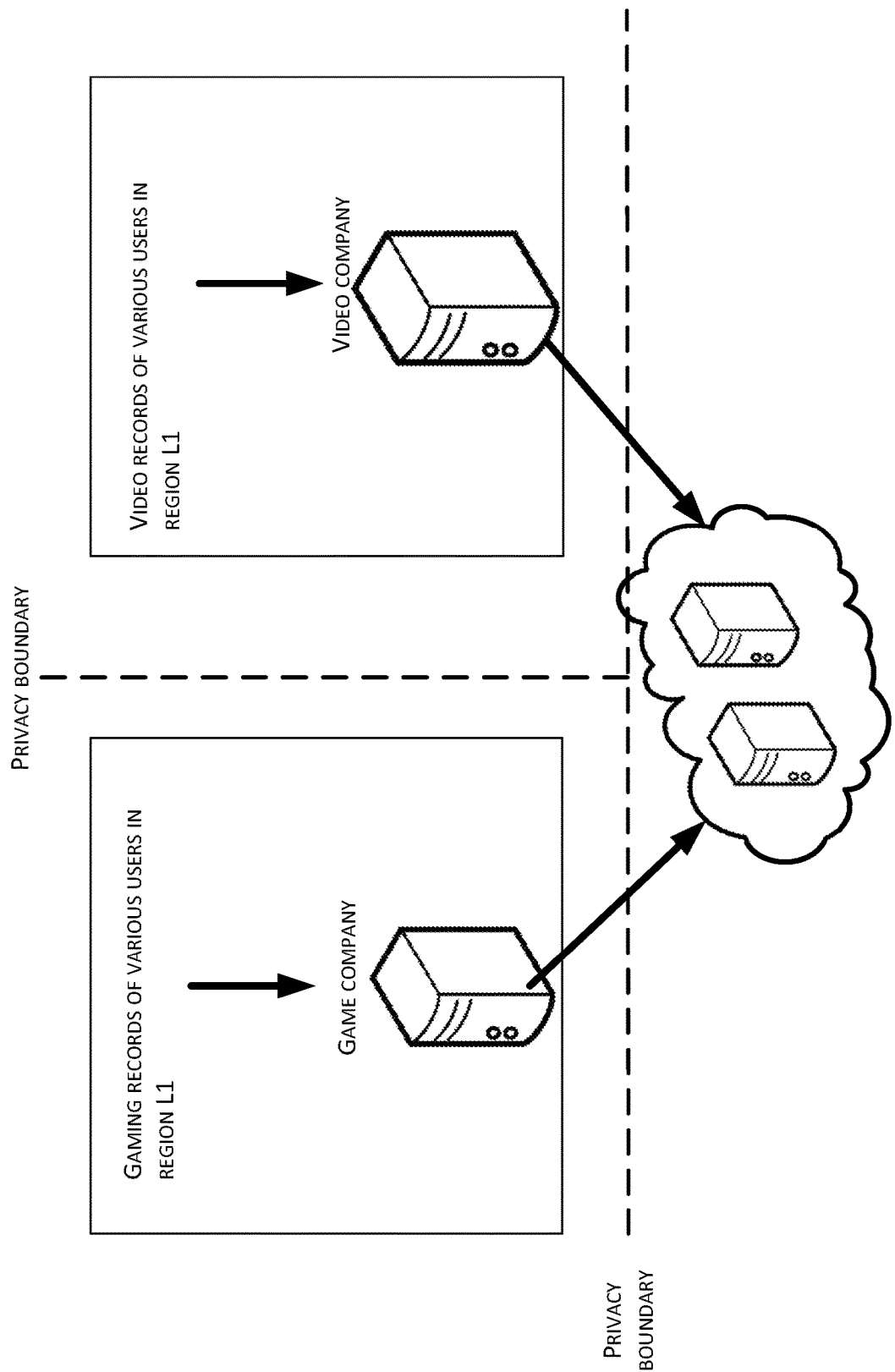
FIG. 1a is a schematic diagram of a privacy boundary under VFL provided by the embodiments of the present disclosure.

In order to make the purposes, technical solutions and advantages of the embodiments of the present disclosure clearer, the technical solutions in the embodiments of the present disclosure will be clearly and completely described below with reference to the accompanying drawings in the embodiments of the present disclosure. Apparently, the described embodiments represent some and not all of the embodiments of the present disclosure. Based on the embodiments of the present disclosure, all other embodiments obtained by one of ordinary skill in the art without making any creative effort shall fall within the scope of protection of the present disclosure.

In addition, time sequences of steps in the following method embodiments are only examples, and are not strictly limited.

Matrix decomposition (MF for short) is a basic problem in recommendation systems. As the name suggests, matrix decomposition is to decompose a matrix into two or more matrices, so that the original matrix can be obtained from the decomposed matrices through multiplication.

In practice, a problem faced by a recommendation system can be expressed as: possibly collecting scoring situations of a large number of users on a large number of items to form a scoring matrix. In the scoring matrix, generally only some scores are known, and many scores are missing and set by default, that is, only scores of some users for some items can be collected. At this time, a recommendation model needs to be trained, so that the missing scores can be predicted based on the recommendation model. It is understandable that prediction results of the recommendation model for the known scores need be as close as possible to the known scores. In this way, based on the trained recommendation model, items can be recommended for each user: according to a prediction result of a user's score for each item, the user's preference for each item is known (the higher the score, the more preferred it is), Thereby, items of preference of the user are recommended. In practical applications, items may be film and television works, commodities, game products, etc.

The above training of a recommendation model is actually a MF problem: taking a scoring matrix as input, by learning to represent users and items as low-dimensional expression (embedding) vectors, forming a user expression matrix by user expression vectors corresponding to all the users, and forming an item expression matrix by item expression vectors corresponding to all the items. Therefore, a dot product of a user expression vector and an item expression vector can be used to predict a degree that a user likes an item. In fact, the user expression matrix and the item expression matrix are model parameters of a recommendation model, and the two matrices into which the scoring matrix is decomposed.

In addition, in today's increasingly strengthened and planned data privacy security supervision, many data-driven services on the Internet face new challenges and opportunities. For example, when training a recommendation model that recommends information to users, data security issues need to be considered in a model training process.

In machine learning scenarios such as recommendation models, one primary problem to be faced is the problem of data islands, that is, each data aggregator has relatively little data for model training, and a recommendation model is trained only based on data owned by one data aggregator. The performance of the model tends to be poor. Therefore, in order to train a recommendation model with a better performance, a federated learning machine learning framework emerges.

Federated learning is a technology of distributed machine learning, and is a machine learning technology jointly carried out among multiple data aggregators. Each data aggregator uses its own data to train a model, and parameters of the trained model are then integrated. In this way, the data used for model training may not leave the data aggregator, or be encrypted or desensitized when leaving the data aggregator. The goal of federated learning is to ensure the privacy, security, and compliance of training data under the premise of legal requirements, while improving the efficiency of model training through distributed training. In this disclosure, each party involved in the joint modeling is called a data aggregator, which is generally an enterprise or an institution. According to different data distribution characteristics between different data aggregators, federated learning can be divided into the following types: Vertical Federated Learning (referred to as VFL), Horizontal Federated Learning (referred to as HFL) and Local Federated Learning (referred to as LFL).

Based on the above classification results of federated learning, a matrix decomposition problem can be processed under different federated learning types, that is, to learn recommendation models corresponding to different federated learning types. Under each type of federated learning, different data aggregators can jointly perform modeling based on respective scoring matrices collected thereby without revealing private data of respective users.

Under VFL, scoring matrices collected by all data aggregators share the same set of users, but there is no intersection on sets of items. A typical scenario is: two companies located in the same region, one is an online content platform and the other is a local retailer, both have the same customer base, but each has different customer behavior information. If they want to collaborate on training a recommendation model, the recommendation model could learn both users' viewing behaviors of online content (such as videos, music) and users' purchase behaviors at local retail stores.

Under HFL, each data aggregator has a private set of users, but different data aggregators have the same set of items. A typical scenario is: different hospitals have different medical records of patients, that is, different sets of visiting persons, but different hospitals have the same set of diseases. At this time, different hospitals want to cooperate to train a disease prediction model (essentially a recommendation model).

LFL can be regarded as a special case of HFL. Under LFL, each user acts as a data aggregator and has his/her own scoring matrix. A typical scenario is that in a mobile application, each user only stores his/her own scoring information for some items in his/her own terminal device (or device), and does not want to share this information with other users (data aggregators). In some mobile application scenarios, it is necessary to combine private data information of a number of users to train a recommendation model, which belongs to LFL.

As mentioned above, under a federated learning framework, modeling needs to be performed jointly by multiple data aggregators. If multiple data aggregators are allowed to directly interact with each other user data for joint modeling, it will lead to user data security issues. In particular, under conditions stipulated by law, data of a user needs to be ensured not to leave a data aggregator authorized by the user without authorization. Therefore, user data cannot be shared among different data aggregators. Therefore, technical means are needed to achieve the purpose of joint modeling by multiple data aggregators, and at the same time prevent user data from leaving its data aggregator, especially where user privacy information (sensitive information) cannot be leaked out of its data aggregator.

In order to avoid direct interactions of information between different data aggregators, in a federated learning system provided by the embodiments of the present disclosure, a server is set and configured to perform federated learning training in conjunction with multiple data aggregators. During a training process of federated learning, each data aggregator locally performs iterative training, and some model parameters generated during a process of local training need to be shared with the server, so that the server can combine the model parameters shared by each data aggregator to optimize the model parameters and to guide each data aggregator to update their model parameters obtained by the local training. In this way, a private recommendation model that is finally obtained by each data aggregator incorporates semantic information learned from user data of other data aggregators, thus improving the quality of the model.

Users' private information is actually implied in the model parameters shared with the server. Under different federated learning types, the users' private information owned by different data aggregators is different. For example, under VFL, items under scoring that are owned by different data aggregators are different. Different data aggregators have different sets of users under HFL. In a federated learning process, common information between different data aggregators needs to be jointly learned, while difference information does not leave the data aggregators. Therefore, under VFL, what needs to be shared with the server is respective user expression matrices trained locally by each data aggregator, and the user expression matrices shared by each data aggregator can be protected for privacy. Under HFL, what needs to be shared with the server is respective item expression matrices trained locally by each data aggregator, and the item expression matrices shared by each data aggregator can be protected for privacy. For example, differential privacy can be used to protect the security of shared information. An item expression matrix that does not need to be shared under VFL is iteratively trained and updated locally at its data aggregator, and a user expression matrix that does not need to be shared under HFL is iteratively trained and updated locally at its data aggregator.

Based on the situation that user information cannot be shared between different data aggregators and there is information sharing between data aggregators and the server as described above, in practice, in order to ensure the security of the user information, under different federated learning types, it is possible to set different privacy boundaries. A privacy boundary is used to define a boundary that users' private information cannot traverse, or privacy protection is required when traversing.

For example, in VFL and HFL, it can be considered that users trust their corresponding data aggregators. Therefore, the users can directly provide their own scoring information for multiple items to their corresponding data aggregators. At this time, it is considered that there is no privacy boundary between the users and their data aggregators. However, for different data aggregators, there is a privacy boundary between different data aggregators, that is, it is required that different data aggregators cannot directly exchange information. In addition, a privacy boundary may also exist between different data aggregators and the server, which is used to require user privacy information shared by the data aggregators to the server to be protected.

Figure 1B:
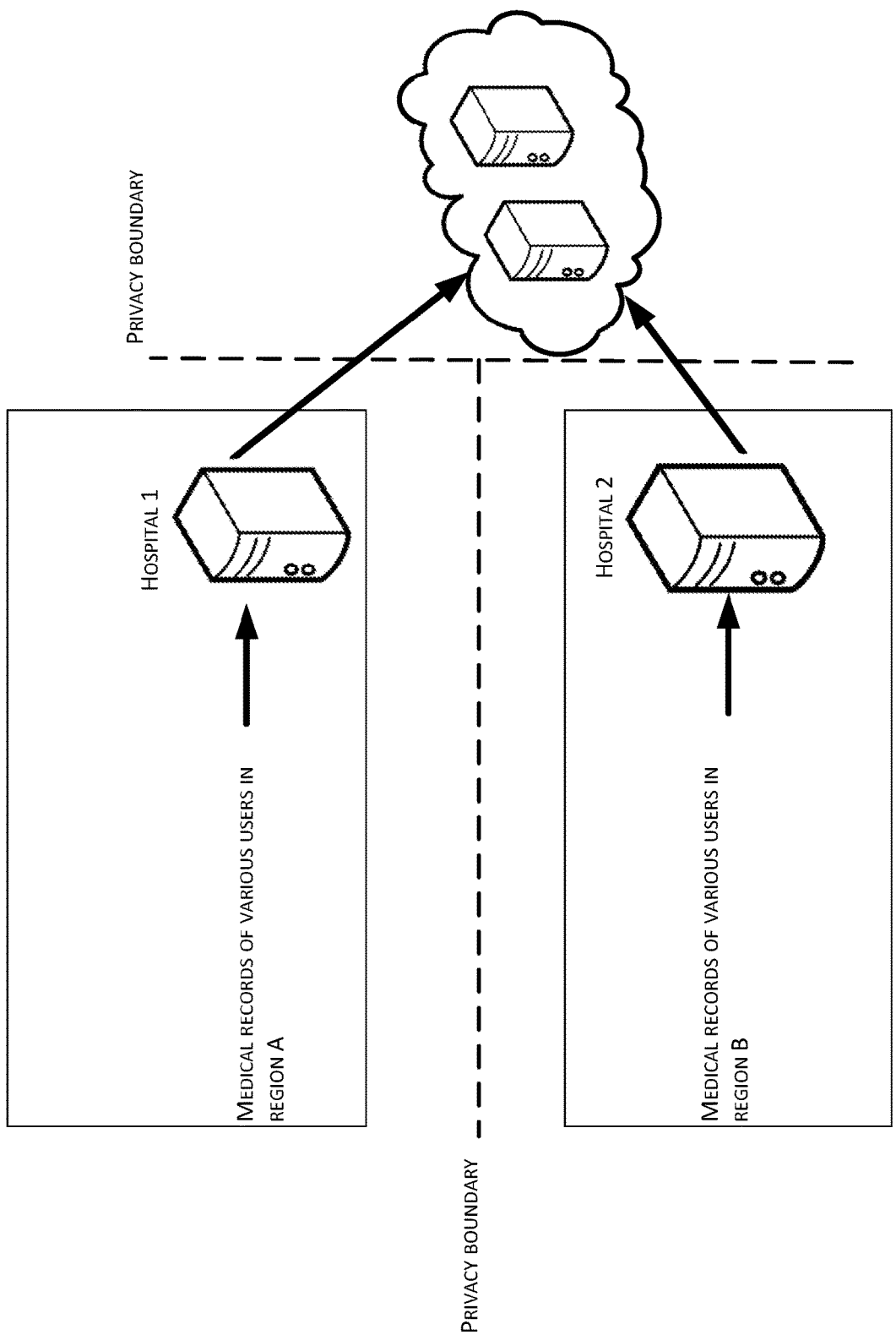
FIG. 1b is a schematic diagram of a privacy boundary under HFL provided by the embodiments of the present disclosure.

Privacy boundaries under VFL and HFL are illustrated in FIG. 1$a$ and FIG. 1$b$ respectively. In short, in an optional embodiment of the present disclosure, for a classic technical problem in a recommendation system—a matrix decomposition algorithm, a federated learning framework guaranteed by data privacy theory is proposed. As such, when user data is distributed vertically (vertical federated learning) in different data aggregators, multiple parties can jointly perform modeling without revealing the privacy of their respective users.

A process of implementation of the solutions provided by the present application will be described in detail below with reference to the following embodiments.

Figure 2:
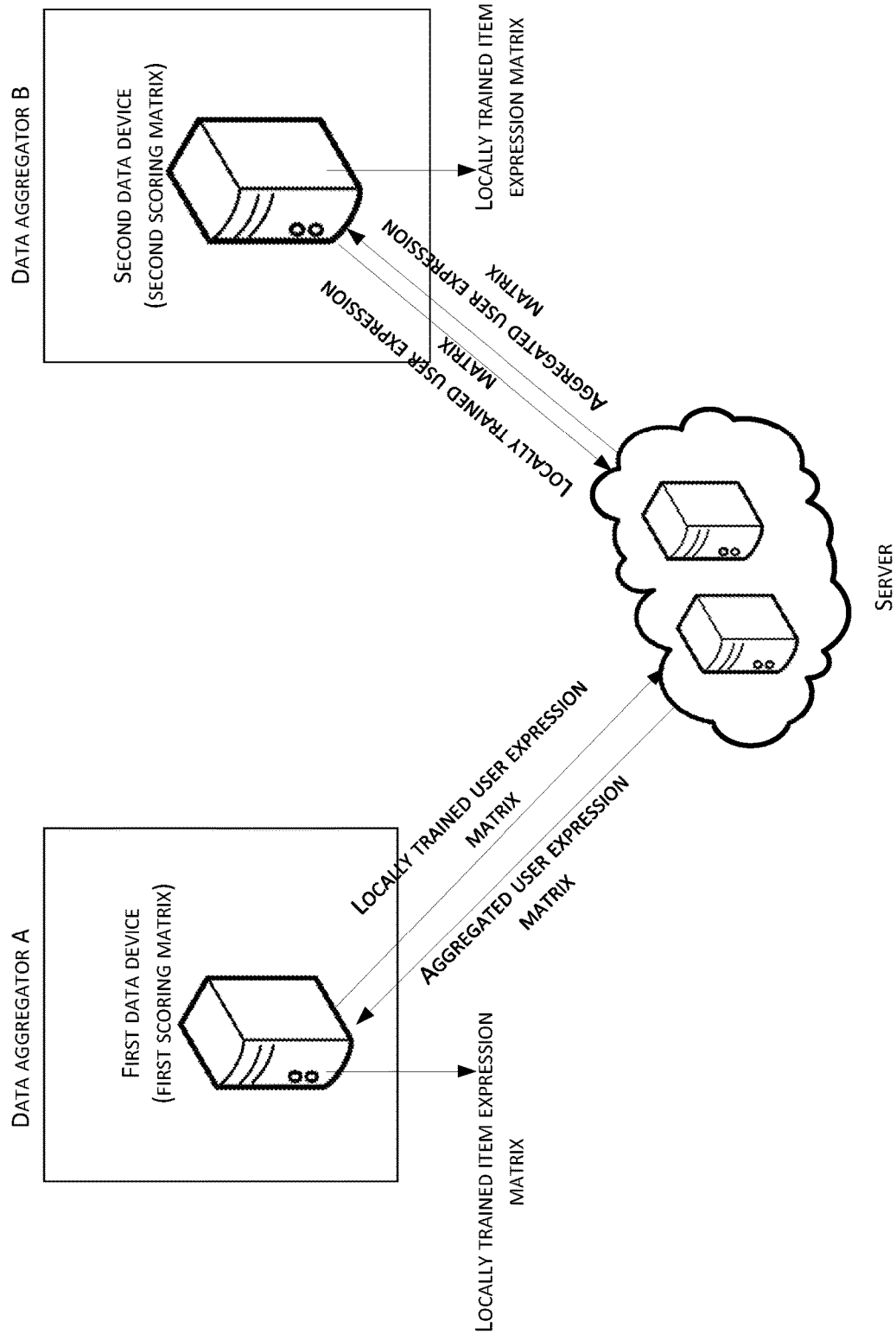
FIG. 2 is a schematic diagram of a learning system for user privacy protection provided by the embodiments of the present disclosure.

FIG. 2 is a schematic diagram of a learning system for user privacy protection provided by the embodiments of the present disclosure. As shown in FIG. 2, the system includes multiple data devices and a server for performing federated learning. For convenience of description, FIG. 2 only illustrates a situation including a first data device and a second data device.

In practical applications, a data device corresponds to a data aggregator, and a data aggregator can collect user data locally. For example, the first data device shown in FIG. 2 corresponds to a data aggregator A, and the second data device corresponds to a data aggregator B. For example, a data aggregator may be a provider of a certain service, and its corresponding data device may be a server that provides the service. It can be understood that the server serving as a data device is different from the above-mentioned server for federated learning, and the above-mentioned server for federated learning refers to a server used to coordinate with various data devices to perform joint training of a recommendation model.

In the embodiments of the present disclosure, user data is finally represented as a scoring matrix, which is used to reflect evaluation behaviors of users on items.

For example, the first data device of the data aggregator A is a server set up by an e-commerce company located in a certain region L1, and can collect shopping behavior data of several users in the local area. Based on the collection of these pieces of data, the data aggregator A can obtain a scoring matrix, in which the rows represent users and the columns represent products, and summarize locally collected user sets and product sets to form each row and each column in the matrix. Values of elements in the matrix represent users' scores for items. For example, by collecting evaluation behaviors of each user on each product, the following scores are obtained. If a user likes a product, a corresponding score is 5. If a user does not like a product, a corresponding score value is 0. If no evaluation behavior of a user on a product is collected, a corresponding score value is a missing value. For another example, the second data device of the data aggregator B is a server set up by another e-commerce company located in the region L1, and a corresponding scoring matrix can be obtained through a similar data collection process. In the above example, user's scoring for products is taken as an example, and accordingly, a trained recommendation model is used to recommend products for the users.

For another example, the data aggregator A is a game company located in L1 in a certain region, and can collect gaming behavior data of several users in the region. Based on the collection of these pieces of data, the data aggregator A can obtain a scoring matrix. Scores in this scoring matrix can be determined, for example, by the following rules: presetting a corresponding relationship between different numbers of times of opening and different scores, and determining a user's score for a certain game according to a cumulative number of times of opening the game by the user. If no usage record of a certain user for a certain game is collected, a corresponding score is set to a missing value. The data aggregator B is a video company located in region L1 that provides a video website, and can collect video viewing, downloading, and collecting behavior data of several users in the region, and generate a scoring matrix based on the collected data. The scoring matrix is used to reflect users' preference for each video. For example, if a user has watched, downloaded, or favorited a certain video, a corresponding score is 1. If a user has watched a certain video, a corresponding score is a missing value.

In practice, objects that can be recommended for a user may include commodities, music, videos, games, literary works, etc. Therefore, recommended objects are collectively referred to as items in this disclosure.

The solutions provided by the embodiments of the present disclosure may be applicable to situations of vertical federated learning. As mentioned above, the so-called vertical federated learning refers to a situation where each data aggregator participating in federated learning has a same set of users but different sets of items. Following the above example, for example, a scoring matrix obtained by the data aggregator A includes a N1 number of users and a M1 number of products, and a scoring matrix obtained by the data aggregator B also includes the same N1 number of users and another different M2 number of products. At this time, the scoring matrices collected by the data aggregator A and data aggregator B can be used to train a recommendation model by means of vertical federated learning. To put it another way, for a same user, it can be considered that some of his/her evaluation behaviors come from the data aggregator A, and the other part of the evaluation behaviors come from the data aggregator B.

In short, in the embodiments of the present disclosure, each data aggregator can obtain its own corresponding scoring matrix by collecting its own local user data, and different data aggregators do not share their own scoring matrices to protect the privacy and security of user data.

In addition, model parameters of the recommendation model to be trained in the embodiments of the present disclosure mainly include a user expression matrix and an item expression matrix. The user expression matrix and the item expression matrix are matrices obtained by matrix decomposition of the scoring matrix. That is to say, in the embodiments of the present disclosure, the training of the recommendation model is converted into a matrix decomposition problem. The training of the recommendation model is realized by solving the matrix decomposition problem under the vertical federated learning framework, so it can be called a federated matrix decomposition solution.

In general, the user expression matrix is used to describe users' preference features, that is, the users' degrees of interest in the items with what types of attribute features. The item expression matrix is used to describe attribute features of the items. For a scoring matrix, the scoring matrix is approximately equal to a dot product of its corresponding user expression matrix and item expression matrix.

In the embodiments of the present disclosure, a structure of implementation of a recommendation model is not limited. From a functional point of view, it mainly includes an embedding layer and an output layer, wherein the embedding layer is used to encode an input scoring matrix to obtain a corresponding user expression (or embedding) matrix and an item expression (or embedding) matrix. The output layer is mainly used to output a dot product result of the user expression matrix and the item expression matrix, and calculate a loss function.

It is understandable that training of the recommendation model is carried out continuously in an iterative manner. In other words, the user expression matrix and the item expression matrix will be iteratively updated continuously. In each iteration process, a computation of a gradient of a corresponding loss function will be performed, to update the corresponding expression matrix through a back-propagation algorithm such as stochastic gradient descent, etc.

The methods of federated learning provided by the embodiments of the present disclosure do not mean that the server collects scoring matrices of each data device to form a complete scoring matrix, performs model training based on the complete scoring matrix, and finally distributes a training result to each data device for use. Instead, each data device will eventually obtain a recommendation model for its own use based on a scoring matrix collected thereby, but need to rely on the server to assist in aggregation of relevant intermediate information to improve model performance in a training process of the corresponding recommendation model. From the perspective of final training results, each data device will get a single unified user expression matrix, but each will have a different item expression matrix. As mentioned above, the purpose of recommendation model training is to obtain model parameters. For each data device, model parameters of a corresponding recommendation model mainly refer to the unified user expression matrix and its corresponding item expression matrix.

In combination with the above description, with an assumption that the data devices includes the first data device corresponding to the data aggregator A and the second data device corresponding to the data aggregator B in FIG. 2, in general, main operations of each data device and server involved in a training process are as follows:

The first data device is configured to obtain a locally collected first scoring matrix, the first scoring matrix being used to describe scoring situations of multiple users on multiple items; and locally train a first item expression matrix and a first user expression matrix corresponding to the first scoring matrix, send the first user expression matrix to the server, and receive a second user expression matrix fed back by the server, predict degrees of preference of the multiple users for the multiple items in the first scoring matrix based on the first item expression matrix and the second user expression matrix if a training cut-off condition is met, and perform item recommendations for the multiple users according to the degrees of preference, wherein the first user expression matrix is sent to the server in a protected manner.

The second data device is configured to obtain a locally collected second scoring matrix, the second scoring matrix being used to describe scoring situations of the multiple users on the multiple items, and the first scoring matrix and the second scoring matrix having a same user set and different item sets; and locally train a second item expression matrix and a third user expression matrix corresponding to the second scoring matrix, send the third user expression matrix to the server, receives the second user expression matrix fed back by the server, and if the training cut-off condition is met, predict degrees of preference of the multiple users for the multiple items in the second scoring matrix based on the second item expression matrix and the second user expression matrix if a training cut-off condition is met, and perform item recommendations for the multiple users according to the degrees of preference, wherein the third user expression matrix is sent to the server in a protected manner.

The server is configured to perform aggregation processing on the first user expression matrix and the third user expression matrix to obtain the second user expression matrix, and send the second user expression matrix to the first data device and the second data device.

The first user expression matrix and the third user expression matrix as described above may be sent to the server for aggregation processing in a certain set protection mode. Optionally, the protection mode includes, but is not limited to, encryption protection and differential privacy protection. Since user data may actually be leaked in the user expression matrix, performing protection during transmission to the server can prevent the leakage of the user data and ensure the security of the user data.

It needs to be noted that, in the embodiments of the present disclosure, under the vertical federated learning type, different data aggregators are assumed to have the same set of users. In practice, it is just fine to consider different data aggregators to have a large number of overlapping users, or it is possible not to limit that the sets of users are exactly the same.

In practical applications, the above local training process of the data devices is completed through an iterative process, that is, multiple iterative processes are performed, and a cut-off condition of the above-mentioned training may be that a set number of iterations is reached.

In an iterative process, a predicted score is outputted based on a dot product result of a current user expression matrix and a current item expression matrix. By comparing a difference between the predicted score and an original score in a corresponding scoring matrix, a loss function value can be obtained, and a gradient of the loss function is then calculated. Backpropagation updates the user expression matrix and the item expression matrix for the next round of iteration. The gradient of the loss function includes a gradient corresponding to the user expression matrix and a gradient corresponding to the item expression matrix.

In the above description, the first user expression matrix, the first item expression matrix, the third user expression matrix, and the second item expression matrix may be regarded as general terms for corresponding expression matrices in each iteration process, and are not limited to a specific iterative process. The second user expression matrix is an aggregation result of the first user expression matrix and the third user expression matrix uploaded in a certain time.

The first data device corresponding to the data aggregator A is used as an example. When training is ended, if the first data device obtains a first item expression matrix and a second user expression matrix, degrees of preference (i.e., predicted scores) of each user in a scoring matrix for each item in the first scoring matrix can be obtained through a dot product result of the two. In this case, for any user, if the first scoring matrix includes a M1 number of products, the M1 number of products can be sorted based on degrees of preference of the user for the M1 number of products, and products that may be of interest to the user can be recommended according to a sorting result, such as recommending the top K number of products, where K is a preset value.

The operations performed by each data device and the server during a training process have been summarized above. In order to understand the above training process more intuitively, an exemplary description is given with reference to FIG. 3.

Figure 3:
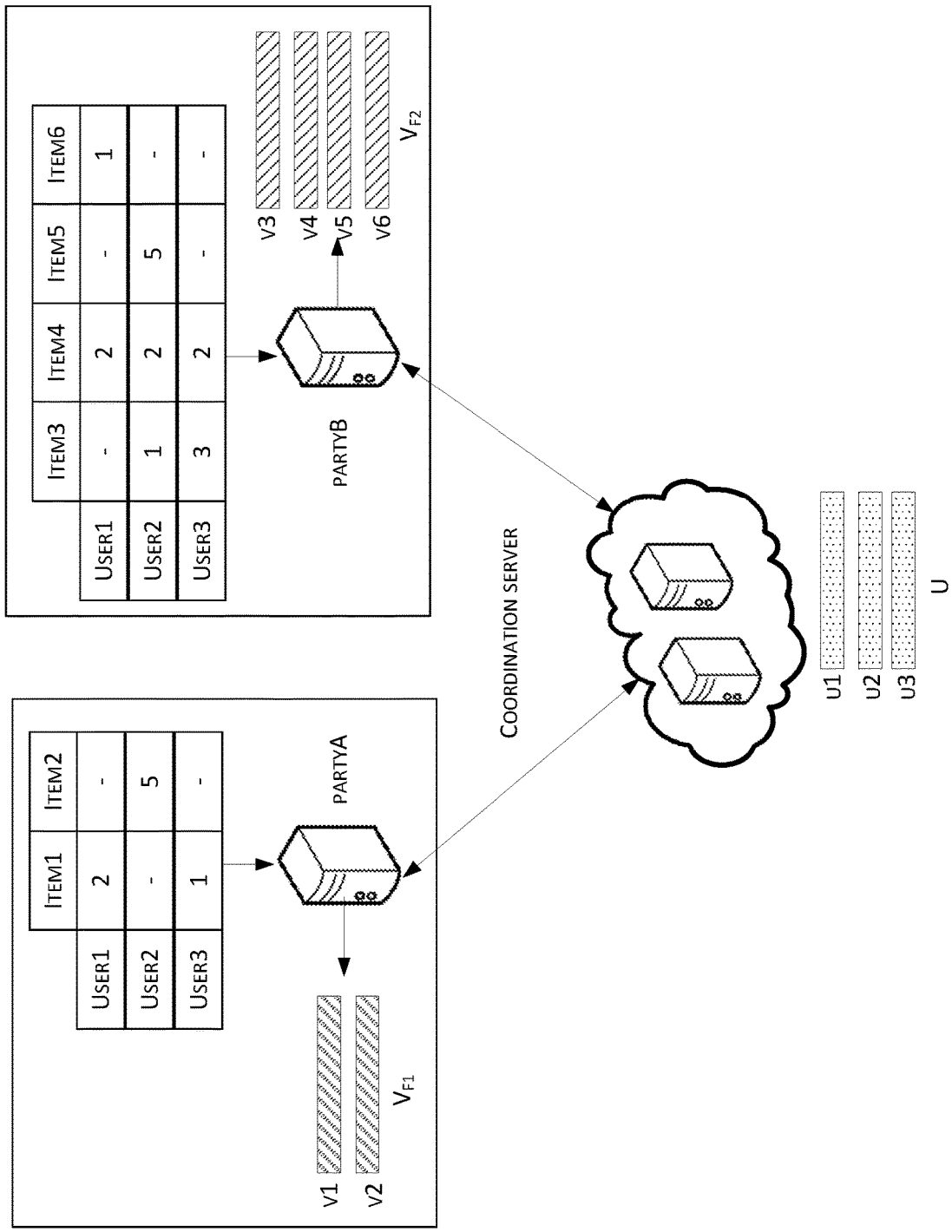
FIG. 3 is an application schematic diagram of a federated learning process provided by the embodiments of the present disclosure.

In FIG. 3, two data aggregators are represented as partyA and partyB respectively. If a first scoring matrix obtained by partyA includes three users, user1, user2, and user3, and items that are scored are represented as items, which include two items, namely, item1 and item2, with respective scores being shown in FIG. 3, where a missing value is expressed as: —If a second scoring matrix obtained by partyB includes three users, user1, user2, and user3, and items that are scored include four items, namely, item3, item4, item5, and item6, with respective scores being shown in FIG. 3. After multiple iterations of training, an item expression matrix obtained by local training of partyA is represented as VF1, which includes two row vectors v1 and v2. An item expression matrix obtained by local training of partyB is represented as VF2, which includes four row vectors v3, v4, v5, and v6. In addition, through a joint training server (a coordination server) shown in the figure, a unified (shared) user expression matrix, denoted as U, can be obtained through training in coordination with each data aggregator, and includes three row vectors u1, u2 and u3. The user expression matrix U can be distributed to each data aggregator for use. In this way, finally, partyA obtains a recommendation model represented by the item expression matrix VF1 and the user expression matrix U, and partyB obtains a recommendation model represented by the item expression matrix VF2 and the user expression matrix U. partyA can predict each missing value in the first scoring matrix through a calculation result of a dot product of the item expression matrix VF1 and the user expression matrix U, and thereby can recommend items of preference (high score) to each user based on a prediction result. The same works for partyB.

In practical applications, as mentioned above, the data device may be a terminal device corresponding to the data aggregator or a server that provides a certain service, which belongs to a device on the user side. Relatively speaking, the server that coordinates with multiple data devices for model training can be located in the cloud.

A number of computing nodes can be deployed in the cloud, and each computing node has processing resources such as computing and storage. In the cloud, multiple computing nodes can be organized to provide a certain service. Apparently, a computing node can also provide one or more services. A way that the cloud provides such services may be to provide a service interface externally, and a user invokes the service interface to use a corresponding service. The service interface includes a software development kit (referred to as SDK), application programming interface (referred to as API), and other forms.

For the solutions provided by the embodiments of the present disclosure, the cloud may provide a service interface for a model training service, and a data aggregator invokes the service interface through its data device to trigger a corresponding request to the cloud. The cloud determines a computing node that responds to the request, and uses processing resources in that computing node to perform a process of aggregating user expression matrices as described above.

A training process of federated learning is described in detail below. Any data device (such as the first data device) among the multiple data devices participating in federated learning is used as an example. In the training process, the following steps need to be performed:

randomly initializing an item expression matrix locally, and obtaining an initialized user expression matrix shared by a server;

performing the following iterative training process until the number of iterations reaches a set value:

after a current round of iteration of training is performed locally on the item expression matrix and the user expression matrix, sending a first user expression matrix obtained by the current round of iteration to the server, wherein one round of iteration includes a set number of iterations;

receiving a second user expression matrix corresponding to the current round of iterations fed back by the server, the second user expression matrix being obtained by the server performing aggregation processing on user expression matrices uploaded by multiple data devices; and performing a next round of iteration of training based on the second user expression matrix corresponding to the current round of iteration.

Figure 4:
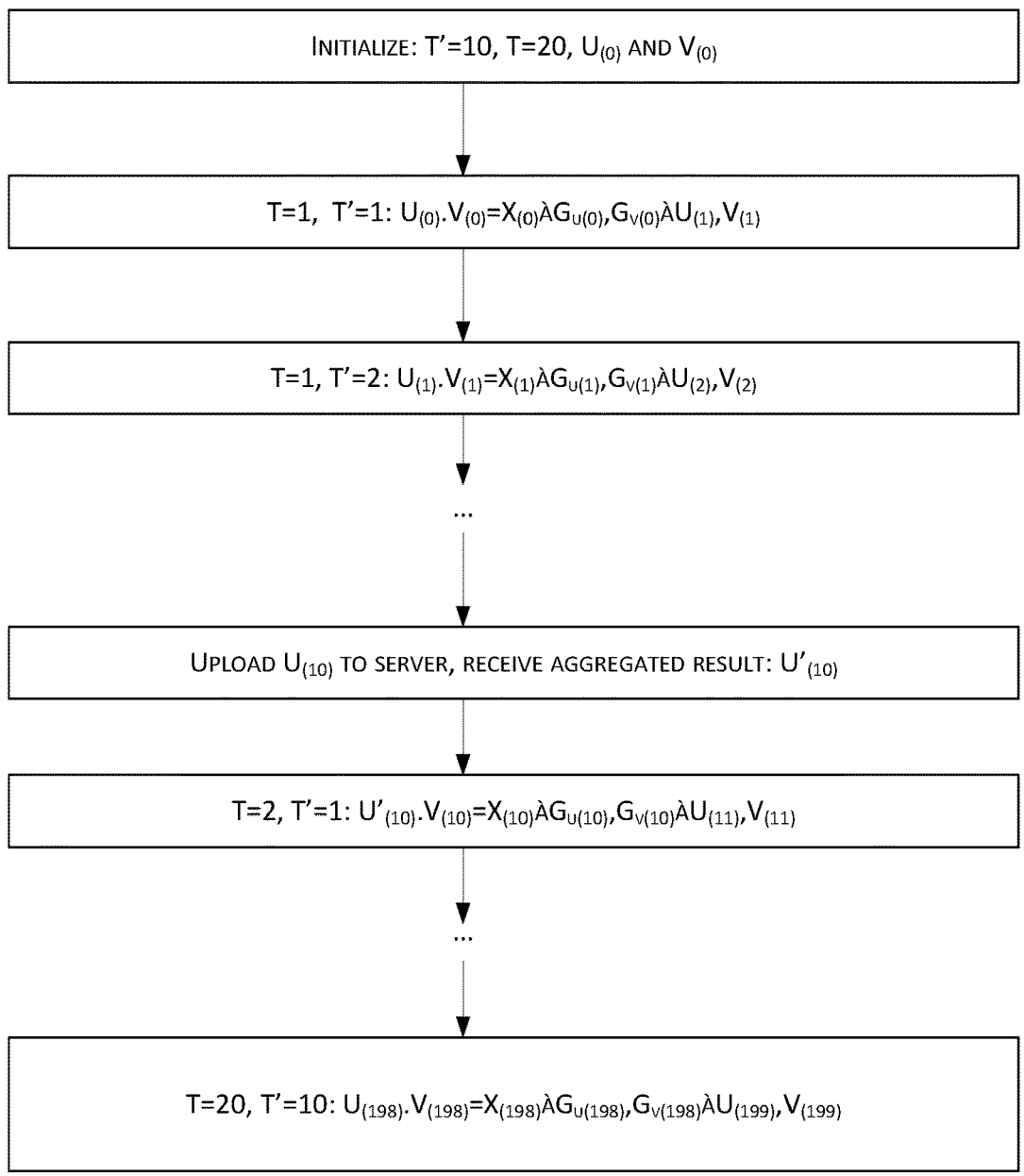
FIG. 4 is a schematic flowchart of a federated learning process provided by the embodiments of the present disclosure.

In order to be able to understand the above training process more intuitively, an exemplary description is given with reference to FIG. 4. First, the meanings of variables shown in FIG. 4 are explained. $U_{(i)}$ and $V_{(i)}$ are used to represent a user expression matrix and an item expression matrix used in an ith iteration process respectively. $X_{(i)}$ is used to represent dot product result of $U_{(i)}$ and $V_{(i)}$. Gu(i) and Gv(i) are used to represent a gradient of a loss function corresponding to the user expression matrix and a gradient of a loss function corresponding to the item expression matrix respectively.

As shown in FIG. 4, in a training process, relevant parameters need to be initialized first. The parameters that need to be initialized here include the number of iterations, a user expression matrix and an item expression matrix. Since the embodiments of the present disclosure adopt a vertical federated learning framework, each data aggregator has the same user set but different item sets. Therefore, during the training process, what can be shared with the server is the user expression matrix, and the item expression matrix is only trained locally and not shared. Therefore, the item expression matrix can be initialized by the first data device, that is, the first data device can randomly initialize the values of each element in the item expression matrix local thereto, while the server initializes the user expression matrix, and distributes the initialized user expression matrix to each data device. In other words, each data device has the same initialized user expression matrix, but a different initialized item expression matrix. In FIG. 4, the initialized user expression matrix is denoted as $U_{(0)}$, and the item expression matrix initialized by the first data device is denoted as $V_{(0)}$.

In addition thereto, the number of iterations needs to be configured. In the embodiments of the present disclosure, optionally, two types of variables for the number of iterations may be set, respectively denoted as T' and T, where T is used to indicate the total number of rounds of iteration, and T' is used to indicate the total number of iterations included in each round of iteration. For example, T'=10, T=20, this means that the total number of iterations is 200, but every 10 iterations is regarded as one round of iteration. The reason why T' and T are set is to reduce the number of interactions between the data device and the server. In other words, the data device does not have to upload the currently obtained user expression matrix to the server for aggregation processing after each iteration, and only needs to upload the user expression matrix that is locally obtained after T' number of iterations to the server for aggregation processing, thereby reducing the communication overhead between the data device and the server and the amount of computations of the server. It can be understood that when the upper limit of T' is 1, this is a situation in which a corresponding user expression matrix is uploaded to the server for aggregation after each iteration.

In the following example, it is assumed that the upper limit values of T' and T are set to 10 and 20 respectively, and initial values are all 1.

Then, as shown in FIG. 4, in the first iteration process, at this time, T=1, T'=1, and the first data device can obtain a dot product result $X_{(0)}$ based on the initialized $U_{(0)}$ and $V_{(0)}$. Based on a comparison between the dot product result and a scoring matrix collected by the first data device, gradients of loss functions: $G_{u(0)}$ and $G_{v(0)}$ can be calculated. Based on the gradients of the loss functions, the initialized user expression matrix and the initialized item expression matrix can be updated, and the update results are: $U_{(1)}$ and $V_{(1)}$.

After that, the second iteration process is performed. At this time, T=1, T'=2, and the first data device can obtain a dot product result $X_{(1)}$ based on $U_{(1)}$ and $V_{(1)}$. Based on a comparison between the dot product result and a scoring matrix collected by the first data device, gradients of loss functions: $G_{u(1)}$ and $G_{v(1)}$ can be calculated. Based on the gradients of the loss functions, the user expression matrix and the item expression matrix can be updated. The update results are: $U_{(2)}$ and $V_{(2)}$. The next iteration is then performed, and so on.

If the tenth iteration process is currently performed, at this time, T=1, T'=10, and the first data device can obtain a dot product result $X_{(9)}$ based on $U_{(9)}$ and $V_{(9)}$. Based on a comparison between the dot product result and a scoring matrix collected by the first data device, gradients of loss functions: $Gu_{(9)}$ and $Gv_{(9)}$ can be calculated. Based on the gradients of the loss functions, the user expression matrix and the item expression matrix can be updated. The update results are: $U_{(10)}$ and $V_{(10)}$.

At this point, the first round of iteration is completed, and the user expression matrix $U_{(10)}$ is uploaded to the server. It can be understood that if multiple data devices perform the above iterative training process, the server can receive user expression matrices $U_{(10)}$ uploaded by the multiple data devices respectively, and the user expression matrices $U_{(10)}$ uploaded by each data device are different. The server aggregates the user expression matrices $U_{(10)}$ uploaded by the multiple data devices, obtain an aggregation result (which is assumed to be expressed as $U'_{(10)}$), and distributes the aggregation result to each data device.

Based on this, the first data device updates the user expression matrix $U_{(10)}$ obtained by local training to $U'_{(10)}$, and performs the next iteration.

In the next iteration process, at this time, T=2, T'=1, and the first data device can obtain a dot product result $X_{(10)}$ based on $U'_{(10)}$ and $V_{(10)}$. Based on a comparison between the dot product result and a scoring matrix collected by the first data device, gradients of loss functions: $Gu_{(10)}$ and $Gv_{(10)}$. Based on the gradients of the loss functions, the user expression matrix and the item expression matrix can be updated. The update results are: $U_{(11)}$ and $V_{(11)}$. By the same token, until T=20, T'=10, the training is completed, $U_{(199)}$ and $V_{(199)}$ are obtained.

The aggregation processing on the server side may be implemented by performing weighted summation processing on the user expression matrices that are uploaded by the multiple data devices, wherein weight values are determined in the following manner:

An example of a first scoring matrix corresponding to the first data device that includes a M1 number of items and a second scoring matrix corresponding to the second data device that includes a M2 number of items is used. If a user expression matrix uploaded by the first data device to the server after a certain iteration process is expressed as Ua, and a user expression matrix uploaded by the second data device to the server after this iteration is expressed as Ub, a weight value corresponding to Ua is then: M1/(M1+M2), and a weight value corresponding to Ub is then: M2/(M1+M2).

In the above training process, the user expression matrices uploaded by each data device may also have the risk of leaking user privacy, because some evaluation behaviors of users may be deduced from the user expression matrices. Therefore, measures that further strengthen user data security can be provided. In addition, in an iterative training process, a problem of gradient overfitting may also be encountered.

To this end, the embodiments of the present disclosure further provide the following two measures to further ensure the user privacy and security, and the model performance: differential privacy and embedding clipping.

The definition of differential privacy is not repeated in the embodiments of the present disclosure, and only definitions of several parameters used are described: a privacy protection budget E and a set privacy confidence $\delta$.

The protection of user privacy based on a differential privacy algorithm can be achieved in the following ways:

Based on a user expression matrix and an item expression matrix corresponding to the (i−1)th iteration, a first loss function gradient corresponding to the user expression matrix and a second loss function gradient corresponding to the item expression matrix are obtained. For the first gradient of loss function and the second gradient of loss function, differential privacy noises are respectively added. According to the first gradient of loss function and the second gradient of loss function that are added to the differential privacy noises, the user expression matrix and the item expression matrix corresponding to the ((i−1)th) iteration are updated to determine a user expression matrix and an item expression matrix corresponding to the ith iteration.

As can be seen, in order to meet the requirements of differential privacy, it is necessary to add noises that meet the requirements of differential privacy to gradients of loss functions corresponding to the user expression matrix and the item expression matrix, which is called differential privacy noises. In this way, the user expression matrix and the item expression matrix, which are updated based on the gradients of loss functions added with differential privacy noises gradients, ensure the privacy and security of user data because of the introduction of differential privacy noises. Therefore, it can be understood that, as described above, when the data device needs to upload a user expression matrix to the server, the uploaded user expression matrix includes a differential privacy noise, so that the server cannot deduce user privacy information.

In practical applications, optionally, a variance of the differential privacy noises can be determined according to parameters defined by the differential privacy algorithm and the number of iterations set in the training process. The differential privacy noises used in the embodiments of the present disclosure may be a Gaussian noise conforming to a zero-mean Gaussian distribution.

Optionally, the variance of the differential privacy noises can be set as:

$$z^2 = c1 \frac{\eta^2 TT' \ln 1/\delta^2}{\varepsilon^2}$$

Where c1 is a preset constant, η is a preset sampling rate (when calculating a gradient of a loss function, a corresponding scoring matrix will be sampled, and the gradient will be calculated based on a sampling result), and T and T' are the number of iterations and the number of iterations included in each round of iteration as mentioned above respectively.

In practice, degrees of change of a user expression matrix and an item expression matrix used in each iteration process will affect a degree of change of gradient. If the degree of change of the gradient is too sensitive, it will easily lead to overfitting. Therefore, there is a need to limit the sensitivity of the gradient. In order to prevent the overfitting problem of model training, a strategy provided by traditional solutions is to clip the gradient in order to limit a value range of the gradient, such as limiting to a value range of [−1, 1]. For example, when the gradient is relatively large, by this type of gradient clipping method, the large gradient is clipped into a smaller gradient, which may easily lead to the loss of effective update information.

In the embodiments of the present disclosure, a new solution is proposed—expression tailoring: limiting respective ranges of values of each element in a user expression matrix and an item expression matrix. Specifically, after a user expression matrix and an item expression matrix corresponding to the ith iteration are determined above, mapping can also be performed on the user expression matrix and the item expression matrix corresponding to the ith iteration according to an upper limit for scores in the scoring matrices collected by the multiple data devices, to limit values of each vector in the user expression matrix and the item expression matrix corresponding to the ith iteration.

If the multiple data devices are composed of a first data device and a second data device, a value range for scores in a first scoring matrix corresponding to the first data device is [1, 5], and a value range for scores in a second scoring matrix corresponding to the second data device is [1, 3], and an upper limit for scores as described above is 5. A square value of the norm of each vector in the user expression matrix and the item expression matrix is limited to a range of [0, 5], where a norm of 2 can be adopted. In other words, in each iteration process, a square value of the norm of each vector in a respective user expression matrix and a respective item expression matrix is within this range, and thereby a resulting gradient of loss function has a limited degree of change.

A user expression matrix and an item expression matrix corresponding to the ith iteration are used as an example. The following mapping processing can be performed on the user expression matrix and the item expression matrix corresponding to the ith iteration:

converting value(s) of negative element(s) therein to zero, i.e., each negative element in each vector being converted to 0; then, for each vector therein: determining a ratio between a norm of that vector and a square root of the upper limit for scores, and normalizing elements in that vector according to the ratio.

For example, an arbitrary vector in the user expression matrix is used as an example. Mapping can be performed according to the following formula:

$$ui/\max(1, \|ui\|_2 \sqrt{R})$$

where R is the upper limit for scores, and represents a 2-norm of the vector ui.

In other words, each element in the vector after converting negative element(s) to 0 is within the above denominator, and a normalization process of the vector is realized.

Both the user expression matrix and the item expression matrix outputted in the same iteration process are subjected to the above-mentioned mapping processing.

It should be noted that, in the embodiments of the present disclosure, the above-mentioned clipping result of the user expression matrix and the item expression matrix will affect the size of the differential privacy noise added to the gradient. In short, if the user expression matrix and the item expression matrix have large degrees of change, in order to meet the differential privacy requirements, a relatively large differential privacy noise needs to be added to the corresponding gradient of loss function. After the above expression clipping processing, the values of the elements in the user expression matrix and the item expression matrix are limited to the set range, and the degrees of change will not be large, so the differential privacy noise added to the corresponding gradient of loss function will also be limited, and the limited result is the value of variance of the differential privacy noise.

In order to facilitate the understanding of the process of differential privacy processing and the process of expression clipping as described above, a training process incorporating these two processes of processing is exemplarily described with reference to FIG. 5.

First, the meanings of the variables shown in FIG. 5 will be explained, where $U_{(i)}$ and $V_{(i)}$ are used to represent the user expression matrix and item expression matrix used in the ith iteration process respectively, and $X_{(i)}$ is used to represent a dot product result of $U_{(i)}$ and $V_{(i)}$, $G_{u(i)}$ and $G_{v(i)}$ are used to represent a gradient of loss function corresponding to the user expression matrix and a gradient of loss function corresponding to the item expression matrix, respectively. $G'_{u(i)}$ and $G'_{v(i)}$ are used to represent results of adding differential privacy noises to $G_{u(i)}$ and $G_{v(i)}$ respectively, and Z( ) represents the above clipping function, which is used to achieve the above clipping result.

Figure 5:
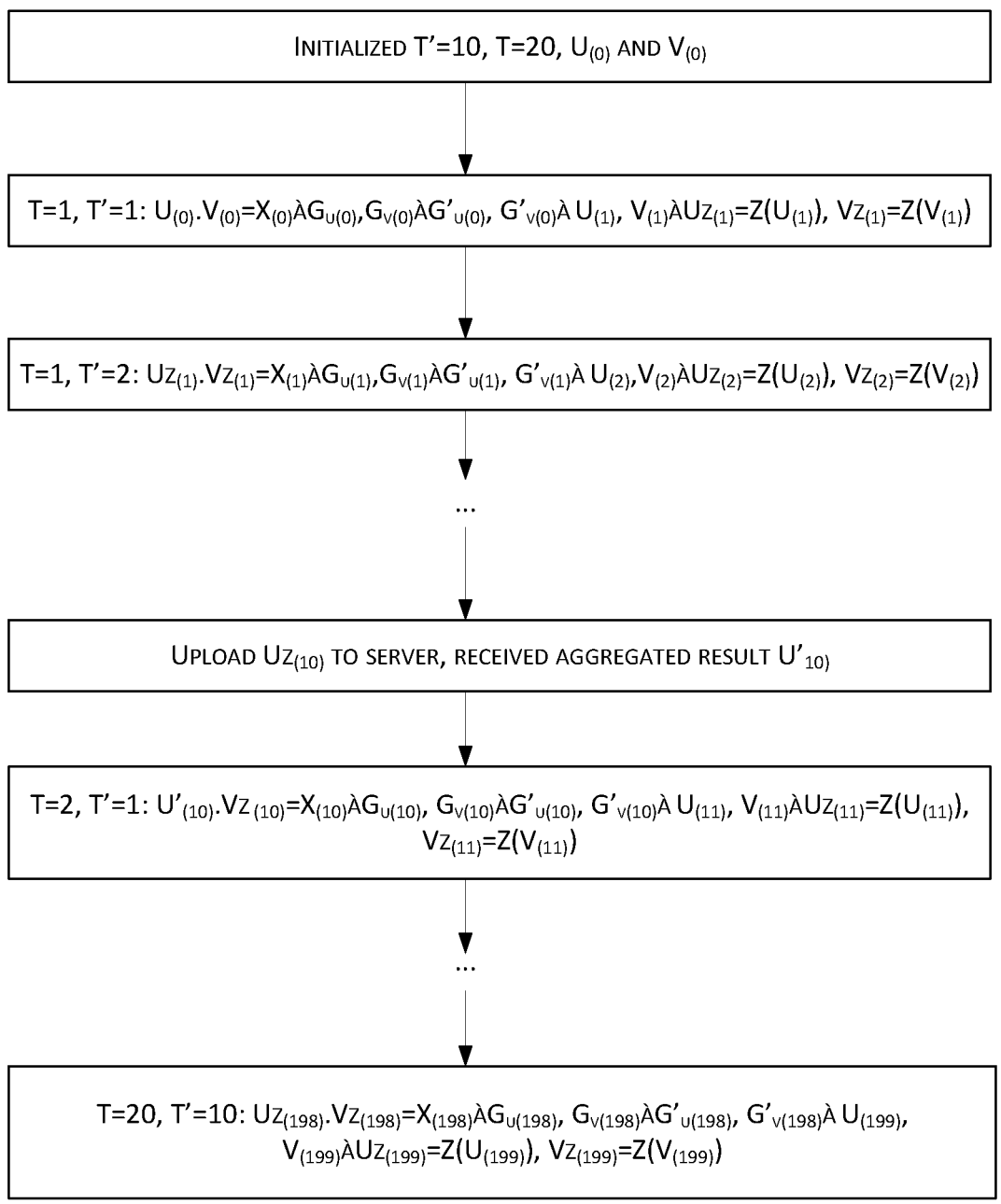
FIG. 5 is a schematic flowchart of another federated learning process provided by the embodiments of the present disclosure.

In FIG. 5, following the example in FIG. 4, the initialized user expression matrix is denoted as $U_{(0)}$, and the item expression matrix initialized by the first data device is denoted as $V_{(0)}$. The total number of rounds of iteration T, and the total number of iterations T' included in each iteration are set, for example, T'=10, T=20.

Then as shown in FIG. 5, in the first iteration process, at this time, T=1, T'=1, the first data device can obtain a dot product result $X_{(0)}$ based on the initialized $U_{(0)}$ and $V_{(0)}$. Based on a comparison between the dot product result and a scoring matrix collected by the first data device, gradients of loss functions: $G_{u(0)}$ and $G_{v(0)}$ can be calculated, and results of adding differential privacy noises thereto are expressed as: $G'_{u(0)}$ and $G'_{v(0)}$. The initialized user expression matrix and the initialized item expression matrix can be updated based on the gradients of the loss functions that are added with the differential privacy noises, and the update results are: $U_{(1)}$ and $V_{(1)}$. After that, a clipping processing is performed on the user expression matrix and the item expression matrix, and the following results are obtained:

$$Uz_{(1)}=Z(U_{(1)}), Vz_{(1)}=Z(V_{(1)}).$$

After that, the second iteration process is performed. At this time, T=1, T'=2, the first data device can obtain a dot product result $X_{(1)}$ based on $Uz_{(1)}$ and $Vz_{(1)}$. Based on a comparison between the dot product result and a scoring matrix collected by the first data device, gradients of loss functions: $G_{u(1)}$ and $G_{v(1)}$ can be calculated, and results of adding differential privacy noises thereto are expressed as: $G'_{u(1)}$ and $G'_{v(1)}$. The user expression matrix and the item expression matrix can be updated based on the gradients of the loss functions that are added with the differential privacy noises, and the update results are: $U_{(2)}$ and $V_{(2)}$. After that, a clipping processing is performed on the user expression matrix and the item expression matrix, and the following results are obtained: $Uz_{(2)}=Z(U_{(2)})$, $Vz_{(2)}=Z(V_{(2)})$. The next iteration is then performed, and so on.

If the tenth iteration process is currently performed, at this time, T=1, T'=10, the first data device can obtain a dot product result $X_{(9)}$ based on $Uz_{(9)}$ and $Vz_{(9)}$. Based on a comparison between the dot product result and a scoring matrix collected by the first data device, gradients of loss functions: $G_{u(9)}$ and $G_{v(9)}$ can be calculated, and results of adding differential privacy noises thereto are expressed as: $G'_{u(9)}$ and $G'_{v(9)}$. The user expression matrix and the item expression matrix can be updated based on the gradients of the loss functions that are added with the differential privacy noises, and the update results are: $U_{(10)}$ and $V_{(10)}$. After that, a clipping processing is performed on the user expression matrix and the item expression matrix, and the following results are obtained: $Uz_{(10)}=Z(U_{(10)})$, $Vz_{(10)}=Z(V_{(10)})$.

At this point, the first round of iteration is completed, and the user expression matrix $Uz_{(10)}$ is uploaded to the server. It can be understood that, if multiple data devices perform the above iterative training process, the server can receive user expression matrices $Uz_{(10)}$ uploaded by the multiple data devices respectively, and the user expression matrices $Uz_{(10)}$ uploaded by each data device is different. The server aggregates the user expression matrices $Uz_{(10)}$ uploaded by the multiple data devices. If an obtained aggregation result is expressed as $U'_{(10)}$, and the aggregation result is distributed to each data device.

Based on this, the first data device updates the user expression matrix $Uz_{(10)}$ obtained by local training to $U'_{(10)}$, and performs a next iteration.

In the next iteration process, at this time, T=2, T'=1, the first data device can obtain a dot product result $X_{(10)}$ based on $U'_{(10)}$ and $Vz_{(10)}$. Based on a comparison between the dot product result and a scoring matrix collected by the first data device, gradients of loss functions: $G_{u(10)}$ and $G_{v(10)}$ can be calculated, and results of adding differential privacy noises thereto are expressed as: $G'_{u(10)}$ and $G'_{v(10)}$. The user expression matrix and the item expression matrix can be updated based on the gradients of the loss functions that are added with the differential privacy noises, and the update results are: $U_{(11)}$ and $V_{(11)}$. After that, a clipping processing is performed on the user expression matrix and the item expression matrix, and the following results are obtained: $Uz_{(11)}=Z(U_{(11)})$, $Vz_{(11)}=Z(V_{(11)})$. By the same token, until T=20, T'=10, the training is completed, $U_{(199)}$ and $V_{(199)}$ are obtained.

As can be seen from the above example, noise that meets the requirements of differential privacy is incorporated into the user expression matrix sent to the server every time, and the user expression matrix that may leak user data is protected by means of differential privacy, thus realizing the protection and security of user data.

In short, in the solutions provided by the embodiments of the present disclosure, for a classic technical problem in a recommendation system—a matrix decomposition algorithm, a federated learning framework guaranteed by data privacy theory is proposed. As such, when user data is distributed vertically (vertical federated learning) in different data aggregators, multiple parties can jointly perform modeling without revealing the privacy of their respective users.

As mentioned above, the item recommendation solutions provided by the embodiments of the present disclosure may be applicable to various information recommendation scenarios such as commodity recommendation, video recommendation, game recommendation, and literary work recommendation, etc. An execution process of video recommendation for a user is exemplarily described below with reference to FIG. 6.

Figure 6:
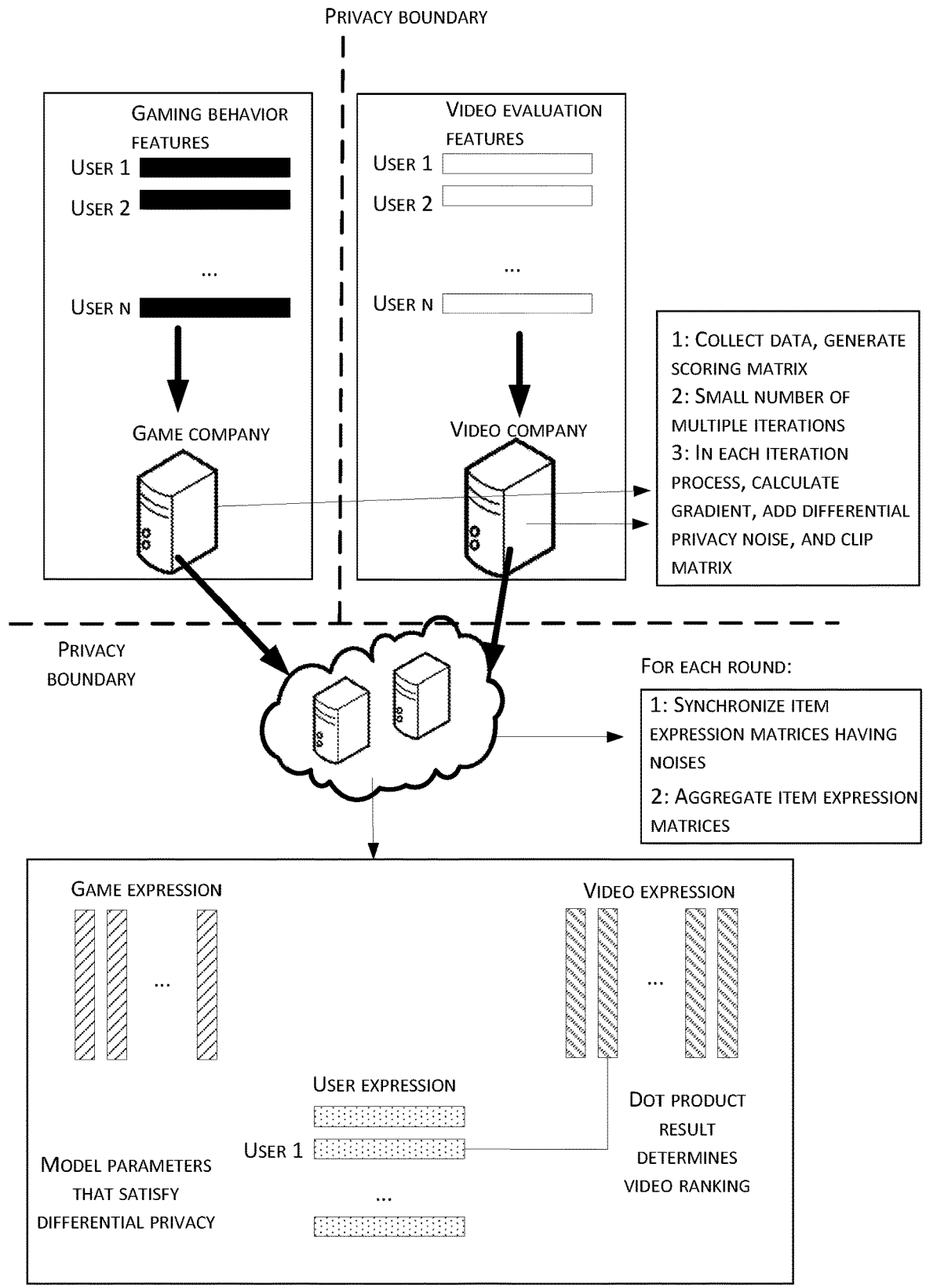
FIG. 6 is an application schematic diagram of a federated learning process provided by the embodiments of the present disclosure.

In FIG. 6, if two data aggregators are a game company in a certain region and a film and television company in that region. Since both are located in the region, a lot of users in the user data collected by the two are the same. These two companies generate their respective scoring matrices based on the user data they have collected. For example, a game company can generate a first scoring matrix by collecting games that have been played by various users. In the first scoring matrix, if a certain user has played a certain game, a corresponding score in that scoring matrix can be set to 1. If a user's usage record of a certain game is not collected, a corresponding score is set as a missing value, indicating that the score is unknown. For another example, the film and television company can collect user ratings for videos, and generate a second scoring matrix based on the collection result. In the second scoring matrix, if a certain user's viewing record of a certain video is collected, a corresponding score is set to 1. If a user's viewing record of a certain video is not collected, a corresponding score is set to a missing value. As can be seen, scores actually reflect the behavior characteristics of users on the sides of different data collection parties, for example, whether a certain video has been watched, an evaluation of a video; whether a certain game has been played. In FIG. 6, these two data aggregators are assumed to have collected relevant data information of a n number of users in total, and obtained corresponding scoring matrices. After collecting the data to obtain the scoring matrices, as shown in FIG. 6, the two data aggregators perform local multi-round mini-batch training, where the mini-batch training refers to multiple iterations included in one round of iteration as described above. In each iteration process, calculating gradients, adding differential privacy noises, updating a user expression matrix and an item expression matrix, and clipping the expression matrix, etc., as described above, will be performed. In addition, in the iterative process, after each round of iteration is completed, a currently obtained user expression matrix that incorporates a differential privacy noise will be uploaded to the server for aggregation.

After a set number of rounds of iteration of training is completed, each data aggregator can obtain its own private item expression matrix and a shared user expression matrix. Based thereon, for example, for a user i (the ith vector in the user expression matrix), the film and television company wants to recommend videos for the user i. In this case, the film and television company can perform a dot product operation between its private item expression matrix and the ith vector in the user expression matrix to obtain predicted scores of each video corresponding to the item expression matrix for the user i. The predicted scores reflect the user's degrees of preference. The higher a score is, the more preferred it is. More preferred videos can be recommended to the user based thereon.

Item recommendation apparatuses of one or more embodiments of the present disclosure will be described in detail below. One skilled in the art can understand that these apparatuses can be configured and formed using commercially available hardware components through the steps taught in the solutions of the present disclosure.

Figure 7:
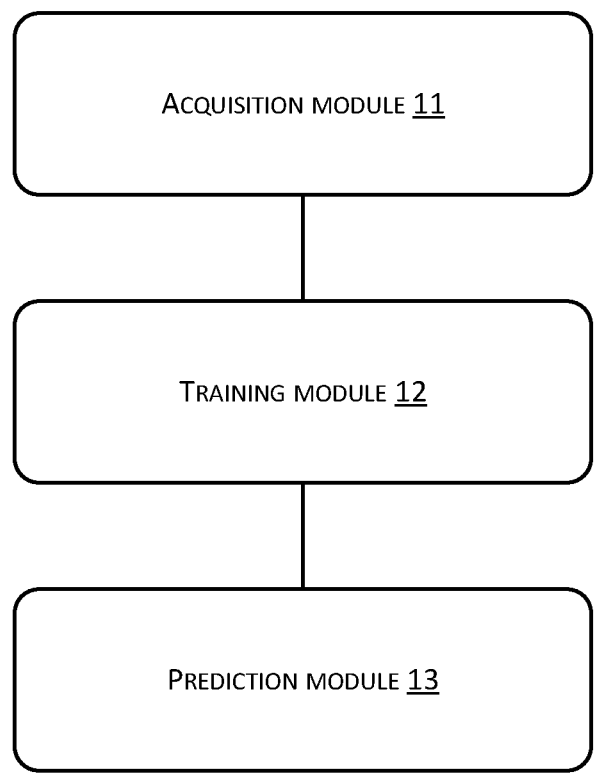
FIG. 7 is a schematic structural diagram of an item recommendation apparatus provided by the embodiments of the present disclosure.

FIG. 7 is a schematic structural diagram of an item recommendation apparatus provided by the embodiments of the present disclosure. The item recommendation apparatus is located in any data device among multiple data devices used for federated learning. As shown in FIG. 7, the apparatus includes: an acquisition module 11, a training module 12, and a prediction module 13.

The acquisition module 11 is configured to obtain a locally collected scoring matrix, the scoring matrix being used to describe a scoring situation of multiple users on multiple items, and scoring matrices collected individually by the multiple data devices having a same user set and different item sets.

The training module 12 is configured to locally train an item expression matrix and a user expression matrix corresponding to the scoring matrix, and send a first user expression matrix obtained by local training to a server, so that the server aggregates and processes user expression matrices independently uploaded by the multiple data devices, and sends an aggregated second user expression matrix to the multiple data devices, wherein the item expression matrix is used to describe attribute features of the multiple items, the user expression matrix is used to describe the multiple users' preference features, and the first user expression matrix is sent to the server in a protected manner.

The prediction module 13 is configured to predict degree of preferences of the multiple users for the multiple items according to the item expression matrix obtained by the local training and the second user expression matrix if a training cut-off condition is met, so that item recommendations are performed for the multiple users according to the degrees of preference.

Optionally, the training module 12 is specifically configured to: randomly initialize an item expression matrix locally, and obtain an initialized user expression matrix shared by the server; and perform the following iterative training process until the number of rounds of iteration reaches a set value:

sending a first user expression matrix obtained by a current round of iteration to the server after the current round of iteration of training is performed locally on the item expression matrix and the user expression matrix, wherein one round of iteration is composed of a defined number of iterations;

receiving a second user expression matrix corresponding to the current round of iteration fed back by the server, wherein the second user expression matrix is obtained by the server performing aggregation processing on user expression matrices uploaded by the multiple data devices; and performing a next round of iteration of training based on the second user expression matrix corresponding to the current round of iteration.

Optionally, the aggregation processing is implemented by performing weighted summation processing on the user expression matrices uploaded by the multiple data devices, wherein weight values corresponding to the first user expression matrix are determined by a ratio between the number of items included in a corresponding scoring matrix and the total number of items included in all scoring matrices.

Optionally, the training module 12 is also configured to: obtain a first loss function gradient corresponding to the user expression matrix and a second loss function gradient corresponding to the item expression matrix based on the user expression matrix and the item expression matrix corresponding to the (i−1)th iteration; add differential privacy noises to the first loss function gradient and the second loss function gradient respectively; update the user expression matrix and the item expression matrix corresponding to the (i−1)th iteration according to the first loss function gradient and the second loss function gradient added with the differential privacy noises, to determine the user expression matrix and the item expression matrix corresponding to the ith iteration; and send the user expression matrix corresponding to the ith iteration to the server.

Optionally, the training module 12 is further configured to perform mapping processing on the user expression matrix and the item expression matrix corresponding to the ith iteration to limit vector values in the user expression matrix and the item expression matrix corresponding to the ith iteration according to a upper limit for scores in the scoring matrices respectively collected by the multiple data devices after determining the user expression matrix and the item expression matrix corresponding to the ith iteration.

Optionally, performing the mapping processing on the user expression matrix and the item expression matrix corresponding to the ith iteration as follows:

converting negative value(s) therein to zero; and for each vector: determining a ratio between a norm of the respective vector and a square root of the upper limit for the scores; and normalizing elements in the vector according to the ratio.

Optionally, the training module 12 is further configured to: determine a variance of the differential privacy noises according to parameters defined by a differential privacy algorithm and the number of iterations, the differential privacy noise conforming to a zero-mean Gaussian distribution.

The apparatus as shown in FIG. 7 can execute the steps performed by the data device in the foregoing embodiments. Details of the execution processes and technical effects can be referenced to the descriptions in the foregoing embodiments, which will not be repeated herein.

Figure 8:
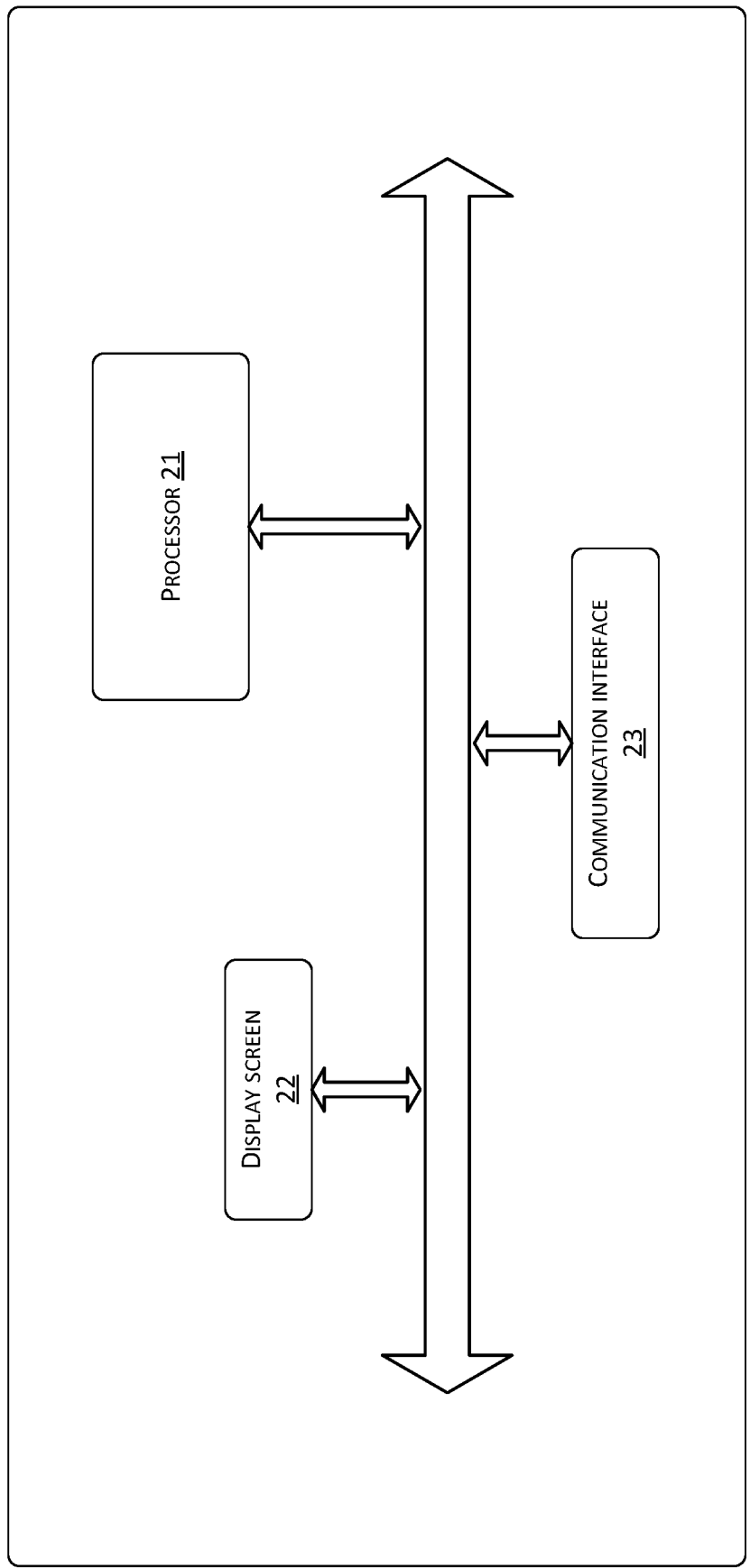
FIG. 8 is a schematic structural diagram of a data device provided by the embodiments of the present disclosure.

In a possible design, the structure of the item recommendation apparatus shown in FIG. 7 can be implemented as a data device, such as a server, a PC, etc. The data device is any one data device of the multiple data devices used for federated learning. As shown in FIG. 8, the data device may include: a processor 21 and a display screen 22.

The processor 21 is configured to obtain a locally collected scoring matrix, the scoring matrix being used to describe a scoring situation of multiple users on multiple items, and scoring matrices collected individually by the multiple data devices having a same user set and different item sets; locally train an item expression matrix and a user expression matrix corresponding to the scoring matrix, and send a first user expression matrix obtained by local training to a server, so that the server aggregates and processes user expression matrices independently uploaded by the multiple data devices, and sends an aggregated second user expression matrix to the multiple data devices, wherein the item expression matrix is used to describe attribute features of the multiple items, and the user expression matrix is used to describe the multiple users' preference features; and predict degree of preferences of the multiple users for the multiple items according to the item expression matrix obtained by the local training and the second user expression matrix if a training cut-off condition is met, so that item recommendations are performed for the multiple users according to the degrees of preference.

The display screen 22, coupled to the processor 21, is configured to display respective items recommended for the multiple users.

As shown in FIG. 7, the data device also includes a communication interface 23 configured to communicate with the server.

Figure 9:
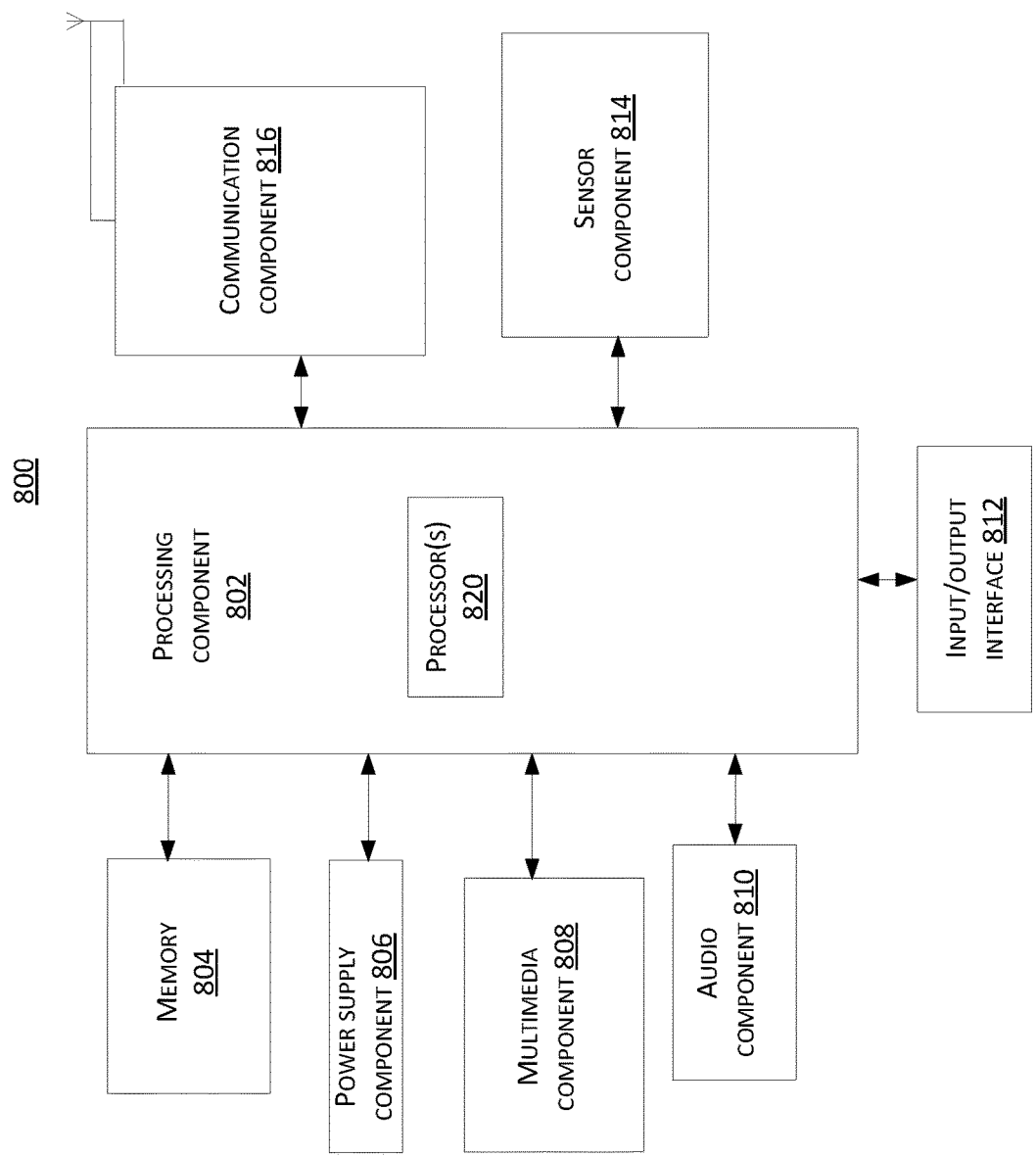
FIG. 9 is a schematic structural diagram of another data device provided by the embodiments of the present disclosure.

FIG. 9 is a schematic structural diagram of another data device provided in the embodiments of the present disclosure. As shown in FIG. 9, the data device 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls overall operations of the data device 800, such as operations associated with display, phone calls, data communications, camera operations, and recording operations. The processing component 802 may include one or more processors 820 to execute instructions to perform all or some of the method steps as described above. Additionally, the processing component 802 may include one or more modules that facilitate interactions between the processing component 802 and other components. For example, the processing component 802 may include a multimedia module to facilitate interactions between the multimedia component 808 and the processing component 802.

The memory 804 is configured to store various types of data to support operations in the data device 800. Examples of such data include instructions for any application or method operating on the data device 800, contact data, phonebook data, messages, pictures, videos, and the like. The memory 804 may be implemented by any type of volatile or nonvolatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 806 provides power to various components of the data device 800. The power supply component 806 may include a power management system, one or more power supplies, and other components associated with generating, managing, and distributing power to the data device 800.

The multimedia component 808 includes a screen that provides an output interface between the data device 800 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensor may not only sense the boundary of a touching or swiping action, but also detect the duration and pressure associated with the touching or swiping action. In some embodiments, the multimedia component 808 includes a front-facing camera and/or a rear-facing camera. When the data device 800 is in an operating mode, such as a shooting mode or a video mode, the front camera and/or the rear camera may receive external multimedia data. Each of the front camera and the rear camera can be a fixed optical lens system or have focal length and optical zoom capability.

The audio component 810 is configured to output and/or input audio signals. For example, the audio component 810 includes a microphone (MIC) that is configured to receive external audio signals when the data device 800 is in an operating mode, such as a call mode, a recording mode, and a voice recognition mode. The received audio signal may be further stored in the memory 804 or transmitted via the communication component 816. In some embodiments, the audio component 810 also includes a speaker for outputting audio signals.

The input/output interface 812 provides an interface between the processing component 802 and a peripheral interface module, which may be a keyboard, a click wheel, a button, or the like. These buttons may include, but are not limited to, a home button, a volume button, a start button, and a lock button.

The sensor component 814 includes one or more sensors for providing status assessments of various aspects of data device 800. For example, the sensor component 814 can detect an open/closed state of the data device 800, relative positioning of the components, such as the display and the keypad of the electronic device 800. The sensor component 814 can also detect a location change of the data device 800 or a component of the data device 800, the presence or absence of user contact with the data device 800, an orientation or acceleration/deceleration of the data device 800, and a temperature change of the data device 800. The sensor component 814 may include a proximity sensor configured to detect the presence of nearby objects in the absence of any physical contact. The sensor component 814 may also include a light sensor, such as a CMOS or CCD image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communications between the data device 800 and other devices. The data device 800 may access wireless networks based on communication standards, such as WiFi, 2G, 3G, 4G, or a combination thereof. In an exemplary embodiment, the communication component 816 receives broadcast signals or broadcast-related information from an external broadcast management system via a broadcast channel. In an exemplary embodiment, the communication component 816 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology and other technologies.

In an exemplary embodiment, the data device 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components to perform the above methods.

In an exemplary embodiment, a non-transitory computer readable storage medium including instructions is also provided, such as the memory 804 including instructions. The instructions can be executed by the processor 820 of the data device 800 to perform the above methods. For example, the non-transitory computer-readable storage medium may be implemented by any type of volatile or non-volatile storage device or a combination thereof, such as static random access memory (SRAM), electrically erasable programmable read only Memory (EEPROM), erasable programmable read only memory (EPROM), programmable read only memory (PROM), read only memory (ROM), magnetic memory, flash memory, magnetic disk or optical disk.

In addition, the embodiments of the present disclosure provide a non-transitory machine-readable storage medium, where executable codes are stored on the non-transitory machine-readable storage medium. When the executable codes are executed by a processor of a data device, the processor can be caused to at least implement the item recommendation methods provided in the foregoing embodiments.

The above embodiments of the present disclosure describe situations of vertical federated learning. In practice, the federated learning methods provided by the embodiments of the present disclosure can also be applied to situations of horizontal federated learning. Horizontal federated learning is used when different data aggregators have different sets of users but the same set of items. For example, for servers providing a certain application located in two different areas, the two servers can collect evaluation information of local users for each commodity in the same commodity set, and obtain their corresponding scoring matrices.

Based on this, in an optional embodiment, another item recommendation method is provided, which is applied to any data device among multiple data devices used for federated learning, and the method includes:

obtaining a locally collected scoring matrix, the scoring matrix being used to describe a scoring situation of multiple users on multiple items, and the scoring matrices collected by each of the multiple data devices having a same item set and different user sets;

locally training an item expression matrix and a user expression matrix corresponding to the scoring matrix, and sending the first item expression matrix obtained by local training to a server, to cause the server to aggregate item expression matrices uploaded by the multiple data devices. process and send an aggregated second item expression matrix to the multiple data devices, wherein the item expression matrix is used to describe attribute features of the multiple items, and the user expression matrix is used to describe the users' preference features; and predicting degrees of preference of a plurality of corresponding local users for the multiple items based on the user expression matrix obtained by the local training and the second item expression matrix if a training cut-off condition is met, and providing item recommendations to the users based on the degrees of preference.

In the process of the above-mentioned horizontal federated learning, the server is used to aggregate item expression matrices uploaded by each data device, because the item set is the intersection between different data devices.

In the process of the above-mentioned horizontal federated learning, details of the execution processes of the data devices and the server can refer to the processes of vertical federated learning, which will not be repeated herein.

The above-mentioned horizontal federated learning method can be applied to scenarios such as disease prediction. An execution process of predicting whether a user is likely to suffer from a certain disease is exemplified below with reference to FIG. 10.

Figure 10:
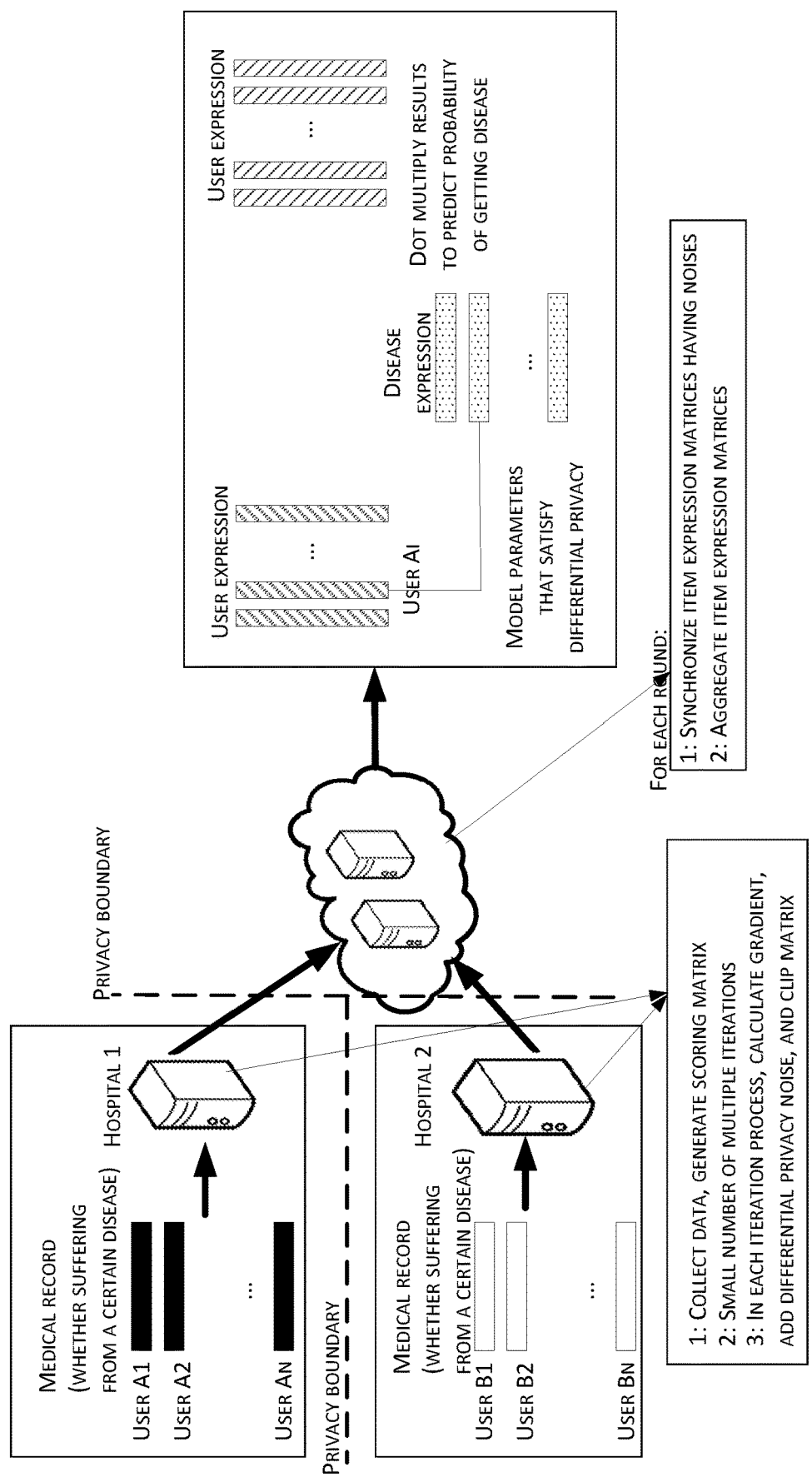
FIG. 10 is an application schematic diagram of a horizontal federated learning process provided by the embodiments of the present disclosure.

In FIG. 10, if two data aggregators are two hospitals located in different regions, and each hospital has its own medical record database. In this application scenario, an item set includes multiple diseases, and user sets are composed of respective medical users of these two hospitals. Therefore, the two hospitals obtain their respective scoring matrices by performing statistics on medical record information of their respective users. If a user's medical record information indicates that the user suffers from a certain disease, a corresponding score can be set to 1. If a user's relevant medical record information records that the user currently does not have a certain disease, a corresponding score is set to a missing value indicating that the score is unknown.

In FIG. 10, if two hospitals have collected scoring matrices of a total of m number of diseases, where users collected by one hospital are represented as A1 to An, and users collected by another hospital are represented as B1 to Bn. After collecting the data to obtain the scoring matrices, as shown in FIG. 10, the two hospitals perform local multi-round mini-batch training, where the mini-batch training refers to multiple iterations included in one round of iteration as described above. In each iteration process, calculating gradients, adding differential privacy noises, updating a user expression matrix and an item expression matrix, and clipping the expression matrix, etc., as described above, will be performed. In addition, in the iterative process, after each round of iteration is completed, a currently obtained user expression matrix that incorporates a differential privacy noise will be uploaded to the server for aggregation.

After a set number of rounds of iteration of training is completed, each hospital can obtain its own private user expression matrix and a shared item expression matrix. Based thereon, for example, it is necessary to predict whether a user Ai in FIG. 10 may suffer from other diseases based on his/her current disease, so as to detect and respond in time. The corresponding hospital can then use the ith vector (corresponding to user Ai) in its private user expression matrix to dot multiply with each vector in the item expression matrix, so as to obtain a predicted score of the user Ai suffering from various diseases. The higher the predicted score is, the more likely to suffer from the corresponding disease is.

The apparatus embodiments described above are merely illustrative, wherein the units described as separate components may or may not be physically separate. Some or all of the modules may be selected according to actual needs to achieve the purposes of the solutions in the embodiments of the present disclosure. One of ordinary skill in the art can understand and implement thereof without making any creative effort.

From the description of the above embodiments, one skilled in the art can clearly understand that each embodiment can be implemented by adding a necessary general hardware platform, and certainly can also be implemented through a combination of hardware and software. Based on this understanding, the essence of above-mentioned technical solutions or the parts that contribute to the existing technologies can be embodied in a form of computer products. The present disclosure can use a form of a computer program product embodied on one or more computer usable storage media that include computer usable program codes (which include, but are not limited to, a magnetic storage device, CD-ROM, an optical storage device, etc.).

Finally, it should be noted that the above embodiments are only used to illustrate the technical solutions of the present disclosure, but not to limit thereto. Although the present disclosure has been described in detail with reference to the foregoing embodiments, one of ordinary skill in the art should understand that the technical solutions described in the foregoing embodiments can be modified, or some technical features thereof are equivalently replaced. These modifications or replacements do not make the essence of the corresponding technical solutions deviate from the spirit and scope of the technical solutions of the embodiments of the present disclosure.

The present disclosure can be further understood using the following clauses.

Clause 1: A learning system for user privacy protection, comprising: a first data device and a second data device for federated learning, and a server, wherein: the first data device is configured to obtain a locally collected first scoring matrix, the first scoring matrix being used to describe scoring situations of multiple users on multiple items; and locally train a first item expression matrix and a first user expression matrix corresponding to the first scoring matrix, send the first user expression matrix to the server, and receive a second user expression matrix fed back by the server, predict degrees of preference of the multiple users for the multiple items in the first scoring matrix based on the first item expression matrix and the second user expression matrix if a training cut-off condition is met, and perform item recommendations for the multiple users according to the degrees of preference, wherein the first user expression matrix is sent to the server in a protected manner; the second data device is configured to obtain a locally collected second scoring matrix, the second scoring matrix being used to describe scoring situations of the multiple users on the multiple items, and the first scoring matrix and the second scoring matrix having a same user set and different item sets; and locally train a second item expression matrix and a third user expression matrix corresponding to the second scoring matrix, send the third user expression matrix to the server, receives the second user expression matrix fed back by the server, and if the training cut-off condition is met, predict degrees of preference of the multiple users for the multiple items in the second scoring matrix based on the second item expression matrix and the second user expression matrix if a training cut-off condition is met, and perform item recommendations for the multiple users according to the degrees of preference, wherein the third user expression matrix is sent to the server in a protected manner; and the server is configured to perform aggregation processing on the first user expression matrix and the third user expression matrix to obtain the second user expression matrix, and send the second user expression matrix to the first data device and the second data device.

Clause 2: The system according to Clause 1, wherein when sending the first user expression matrix to the server, the first data device is configured to: send the first user expression matrix including a differential privacy noise to the server.

Clause 3: The system according to Clause 2, wherein when locally training the first item expression matrix and the first user expression matrix corresponding to the first scoring matrix, the first data device is configured to: obtain a first loss function gradient corresponding to the user expression matrix and a second loss function gradient corresponding to the item expression matrix based on the user expression matrix and the item expression matrix corresponding to an (i−1)th iteration; add differential privacy noises to the first loss function gradient and the second loss function gradient respectively; according to the first loss function gradient and the second loss function gradient added with the differential privacy noises, update the user expression matrix and the item expression matrix corresponding to the (i−1)th iteration to determine a user expression matrix and an item expression matrix corresponding to an ith iteration; send the user expression matrix corresponding to the ith iteration to the server, the first user expression matrix including the user expression matrix corresponding to the ith iteration, and the first item expression matrix including the item expression matrix corresponding to the ith iteration.

Clause 4: An item recommendation method for protecting user privacy, being applied to any data device in multiple data devices used for federated learning, the method comprising: obtaining a locally collected scoring matrix, the scoring matrix being used to describe a scoring situation of multiple users on multiple items, and scoring matrices collected by each of the multiple data devices have a same set of users and different sets of items; locally training an item expression matrix and a user expression matrix corresponding to the scoring matrix, and send a first user expression matrix obtained by local training to a server, so that the server aggregates user expression matrices uploaded by the multiple data devices, processing and sending an aggregated second user expression matrix to the multiple data devices; wherein the item expression matrix is used to describe attribute features of the multiple items, the user expression matrix is used to describe the multiple users' preference features, and the first user expression matrix is sent to the server in a protected manner; and predicting degrees of preference of the multiple users for the multiple items according to the item expression matrix obtained by local training and a second user expression matrix if a training cut-off condition is met, so that item recommendations are performed for the multiple users based on the degrees of preference.

Clause 5: The method according to Clause 4, wherein a training process of the item expression matrix and the user expression matrix comprises: randomly initializing the item expression matrix locally, and obtaining an initialized user expression matrix shared by the server; performing the following iterative training process until a number of iterations reaches a set value: sending a first user expression matrix obtained by a current round of iteration to the server after the current round of iteration of training is performed locally on the item expression matrix and the user expression matrix, wherein one round of iteration is composed of a defined number of iterations; receiving a second user expression matrix corresponding to the current round of iteration fed back by the server, wherein the second user expression matrix is obtained by the server performing aggregation processing on user expression matrices uploaded by the multiple data devices; and performing a next round of iteration of training based on the second user expression matrix corresponding to the current round of iteration.

Clause 6: The method according to Clause 5, wherein the aggregation processing is implemented by performing a weighted summation process on user expression matrices uploaded by the multiple data devices, wherein weight values corresponding to the first user expression matrix are determined by a ratio between the number of items included in a corresponding scoring matrix and a total number of items included in all scoring matrices.

Clause 7: The method according to Clause 4 or 5, wherein a training process of the item expression matrix and the user expression matrix comprises: obtain a first loss function gradient corresponding to the user expression matrix and a second loss function gradient corresponding to the item expression matrix based on the user expression matrix and the item expression matrix corresponding to the (i−1)th iteration; adding differential privacy noises to the first loss function gradient and the second loss function gradient respectively; updating the user expression matrix and the item expression matrix corresponding to the (i−1)th iteration according to the first loss function gradient and the second loss function gradient added with the differential privacy noises, to determine the user expression matrix and the item expression matrix corresponding to the ith iteration; and sending the user expression matrix corresponding to the ith iteration to the server Clause 8: The method according to Clause 7, wherein after determining the user expression matrix and the item expression matrix corresponding to the ith iteration, the method further comprises: performing mapping processing on the user expression matrix and the item expression matrix corresponding to the ith iteration to limit vector values in the user expression matrix and the item expression matrix corresponding to the ith iteration according to a upper limit for scores in the scoring matrices respectively collected by the multiple data devices.

Clause 9: The method according to Clause 8, wherein the mapping processing comprises: performing the following mapping processing on the user expression matrix and the item expression matrix corresponding to the ith iteration: converting negative values therein to zero; and for each vector: determining a ratio between a norm of the respective vector and a square root of the upper limit for the scores; and normalizing elements in the vector according to the ratio.

Clause 10: The method according to Clause 7, further comprising: determining a variance of the differential privacy noises according to parameters defined by a differential privacy algorithm and the number of iterations, the differential privacy noises conforming to a zero-mean Gaussian distribution.

Clause 11: A data device, wherein the data device is any one data device of multiple data devices used for federated learning, comprising: a processor and a display screen, the processor being configured to obtain a locally collected scoring matrix, the scoring matrix being used to describe a scoring situation of multiple users on multiple items, and scoring matrices collected individually by the multiple data devices having a same user set and different item sets; locally train an item expression matrix and a user expression matrix corresponding to the scoring matrix, and send a first user expression matrix obtained by local training to a server, so that the server aggregates and processes user expression matrices independently uploaded by the multiple data devices, and sends an aggregated second user expression matrix to the multiple data devices, wherein the item expression matrix is used to describe attribute features of the multiple items, and the user expression matrix is used to describe the multiple users' preference features; and predict degree of preferences of the multiple users for the multiple items according to the item expression matrix obtained by the local training and the second user expression matrix if a training cut-off condition is met, so that item recommendations are performed for the multiple users according to the degrees of preference; and the display screen, coupled to the processor, is configured to display respective items recommended for the multiple users.

Clause 12: A non-transitory machine-readable storage medium, wherein executable codes are stored on the non-transitory machine-readable storage medium, and when the executable codes are executed by a processor of a data device, the processor is caused to perform the item recommendation method for protecting user privacy according to any one of Clauses 4 to 10.

What is claimed is:

1. A method implemented by a data device, the method comprising:
   obtaining a locally collected scoring matrix, the locally collected scoring matrix being used to describe a scoring situation of multiple users on multiple items;
   locally training an item expression matrix and a user expression matrix corresponding to the locally collected scoring matrix, and sending the locally trained user expression matrix to a server to cause the server to aggregate user expression matrices uploaded by multiple data devices, and process and send an aggregated second user expression matrix to the data device, wherein the multiple data devices comprise the data device; and
   predicting degrees of preference of the multiple users for the multiple items according to the locally trained item expression matrix and the aggregated second user expression matrix if a training cut-off condition is met.

2. The method according to claim 1, wherein the locally collected scoring matrix obtained by the data device has a same set of users as scoring matrices collected by remaining ones of the multiple data devices, and has a different set of items from the scoring matrices collected by the multiple data devices.

3. The method according to claim 1, wherein the item expression matrix is used to describe attribute features of the multiple items, and the user expression matrix is used to describe preference features of the multiple users.

4. The method according to claim 1, wherein the locally trained user expression matrix is sent to the server in a protected manner.

5. The method according to claim 1, further comprising:
   performing item recommendations for the multiple users based on the degrees of preference.

6. The method according to claim 1, wherein locally training the item expression matrix and the user expression matrix comprises:
   randomly initializing the item expression matrix locally, and obtaining an initialized user expression matrix shared by the server; and
   performing an iterative training process until a number of iterations reaches a set value.

7. The method according to claim 6, wherein the iterative training process comprises:
   sending a current user expression matrix obtained by a current round of iteration to the server after the current round of iteration of training is performed locally on the item expression matrix and the user expression matrix, wherein one round of iteration is composed of a defined number of iterations;
   receiving a new second user expression matrix corresponding to the current round of iteration fed back by the server, wherein the new second user expression matrix corresponding to the current round of iteration is obtained by the server after performing aggregation processing on user expression matrices uploaded by the multiple data devices after the current round of iteration; and
   performing a next round of iteration of training based on the new second user expression matrix.

8. The method according to claim 7, wherein the aggregation processing is implemented by performing a weighted summation process on the user expression matrices uploaded by the multiple data devices after the current round of iteration.

9. The method according to claim 1, wherein locally training the item expression matrix and the user expression matrix comprises:
   obtaining a first loss function gradient and a second loss function gradient corresponding to a user expression matrix and an item expression matrix that correspond to an (i−1)th iteration;
   adding differential privacy noises to the first loss function gradient and the second loss function gradient respectively;
   updating the user expression matrix and the item expression matrix that correspond the (i−1)th iteration according to the first loss function gradient and the second loss function gradient added with the differential privacy noises, to determine a new user expression matrix and a new item expression matrix corresponding to an ith iteration; and
   sending the user expression matrix corresponding to the ith iteration to the server.

10. The method according to claim 9, wherein after determining the new user expression matrix and the new item expression matrix corresponding to the ith iteration, the method further comprises:
    performing mapping processing on the new user expression matrix and the new item expression matrix corresponding to the ith iteration to limit vector values in the new user expression matrix and the new item expression matrix corresponding to the ith iteration according to a upper limit for scores in scoring matrices respectively collected by the multiple data devices.

11. The method according to claim 10, wherein the mapping processing comprises:
    converting negative values in the new user expression matrix and the new item expression matrix to zero; and
    for each vector in the new user expression matrix and the new item expression matrix: determining a ratio between a norm of the respective vector and a square root of the upper limit for the scores, and normalizing elements in the respective vector according to the ratio.

12. The method according to claim 9, further comprising:
determining a variance of the differential privacy noises according to parameters defined by a differential privacy algorithm and a number of iterations, the differential privacy noises conforming to a zero-mean Gaussian distribution.

13. One or more non-transitory media storing executable instructions that, when executed by one or more processors of a data device, cause the one or more processors to perform acts comprising:
obtaining a locally collected scoring matrix, the locally collected scoring matrix being used to describe a scoring situation of multiple users on multiple items;
locally training an item expression matrix and a user expression matrix corresponding to the locally collected scoring matrix, and sending the locally trained user expression matrix to a server to cause the server to aggregate user expression matrices uploaded by multiple data devices, and process and send an aggregated second user expression matrix to the data device, wherein the multiple data devices comprise the data device; and
predicting degrees of preference of the multiple users for the multiple items according to the locally trained item expression matrix and the aggregated second user expression matrix if a training cut-off condition is met.

14. The one or more non-transitory media according to claim 13, wherein the locally collected scoring matrix obtained by the data device has a same set of users as scoring matrices collected by remaining ones of the multiple data devices, and has a different set of items from the scoring matrices collected by the multiple data devices.

15. The one or more non-transitory media according to claim 13, wherein the item expression matrix is used to describe attribute features of the multiple items, and the user expression matrix is used to describe preference features of the multiple users.

16. The one or more non-transitory media according to claim 13, wherein the locally trained user expression matrix is sent to the server in a protected manner.

17. The one or more non-transitory media according to claim 13, wherein locally training the item expression matrix and the user expression matrix comprises:
randomly initializing the item expression matrix locally, and obtaining an initialized user expression matrix shared by the server; and
performing an iterative training process until a number of iterations reaches a set value.

18. The one or more non-transitory media according to claim 17, wherein the iterative training process comprises:
sending a current user expression matrix obtained by a current round of iteration to the server after the current round of iteration of training is performed locally on the item expression matrix and the user expression matrix, wherein one round of iteration is composed of a defined number of iterations;
receiving a new second user expression matrix corresponding to the current round of iteration fed back by the server, wherein the new second user expression matrix corresponding to the current round of iteration is obtained by the server after performing aggregation processing on user expression matrices uploaded by the multiple data devices after the current round of iteration; and
performing a next round of iteration of training based on the new second user expression matrix.

19. The one or more non-transitory media according to claim 13, wherein locally training the item expression matrix and the user expression matrix comprises:
obtaining a first loss function gradient and a second loss function gradient corresponding to a user expression matrix and an item expression matrix that correspond to an (i−1)th iteration;
adding differential privacy noises to the first loss function gradient and the second loss function gradient respectively;
updating the user expression matrix and the item expression matrix that correspond the (i−1)th iteration according to the first loss function gradient and the second loss function gradient added with the differential privacy noises, to determine a new user expression matrix and a new item expression matrix corresponding to an ith iteration; and
sending the user expression matrix corresponding to the ith iteration to the server.

20. A data device comprising:
one or more processors; and
memory storing executable instructions that, when executed by the one or more processors, cause the one or more processors to perform act comprising:
obtaining a locally collected scoring matrix, the locally collected scoring matrix being used to describe a scoring situation of multiple users on multiple items;
locally training an item expression matrix and a user expression matrix corresponding to the locally collected scoring matrix, and sending the locally trained user expression matrix to a server to cause the server to aggregate user expression matrices uploaded by multiple data devices, and process and send an aggregated second user expression matrix to the data device, wherein the multiple data devices comprise the data device; and
predicting degrees of preference of the multiple users for the multiple items according to the locally trained item expression matrix and the aggregated second user expression matrix if a training cut-off condition is met.

* * * * *